United States Patent

Hashimoto et al.

[11] Patent Number: 5,963,516
[45] Date of Patent: Oct. 5, 1999

[54] TRACKING CONTROL APPARATUS OF OPTICAL DISC APPARATUS AND METHOD OF SAME

[75] Inventors: Minoru Hashimoto; Shinichi Kariya, both of Chiba, Japan

[73] Assignee: Sony Corporation, Tokyo, Japan

[21] Appl. No.: 08/923,895

[22] Filed: Sep. 4, 1997

[30] Foreign Application Priority Data

Sep. 12, 1996 [JP] Japan ................................. 8-242389

[51] Int. Cl.$^6$ ........................................................ G11B 7/00

[52] U.S. Cl. .................................. 369/44.29; 369/44.32; 369/32

[58] Field of Search ............................. 369/44.27, 44.28, 369/44.29, 44.35, 44.34, 44.41, 44.42, 32

[56] References Cited

U.S. PATENT DOCUMENTS

| | | | |
|---|---|---|---|
| 4,669,072 | 5/1987 | Miura et al. | 369/44.33 |
| 4,932,013 | 6/1990 | Kojima et al. | 369/44.28 |
| 4,974,220 | 11/1990 | Harada | 369/44.28 |
| 5,138,596 | 8/1992 | Yamada | 369/44.36 |
| 5,247,501 | 9/1993 | Hashimoto et al. | 369/44.36 |
| 5,426,625 | 6/1995 | Bui et al. | 369/44.28 |
| 5,650,987 | 1/1995 | Kadowaski | 369/44.36 |

OTHER PUBLICATIONS

"Optical Disc Technology", Supervised by Morio Onoe, Radio Gijutsusha, Published Oct. 1, 1989, pp. 91–98.

Primary Examiner—Nabil Hindi
Attorney, Agent, or Firm—Limbach & Limbach L.L.P.

[57] ABSTRACT

A tracking control apparatus of an optical disc apparatus capable of preventing unstability of the tracking control due to the deviation of balance of a tracking error signal due to a movement of the field of vision of an object lens. A hysteresis tracking error signal is generated by masking a signal of a half cycle of an off-track state of a tracking error signal at the time of a high speed feeding of a sled and the tracking servo control is carried out by using this signal. Namely, with respect to a tracking error signal calculated at a tracking error calculation circuit, a transistor is turned off by an inverted ENABLE signal indicating the state immediately after the high speed feeding of sled, thereby to make the mirror signal valid, the transistor is turned on when this mirror signal is at a high level indicating the detrack state, a hysteresis tracking error signal obtained by reducing the tracking error signal to the ground level is generated, and the tracking servo control is carried out by using this signal. The component of deviation of the tracking error signal due to the movement of the field of vision of the object lens is reduced to a half, therefore the oscillation of the tracking servo control due to an increase of the accumulation of error can be prevented.

21 Claims, 20 Drawing Sheets

GND

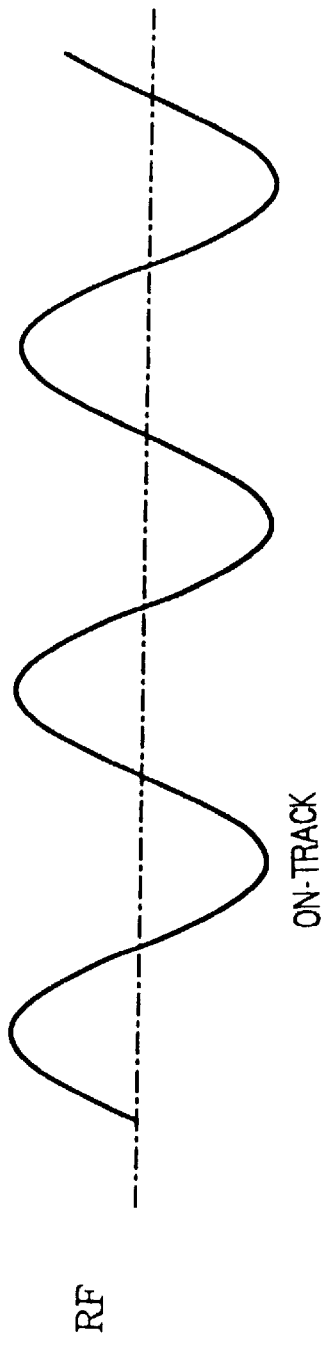
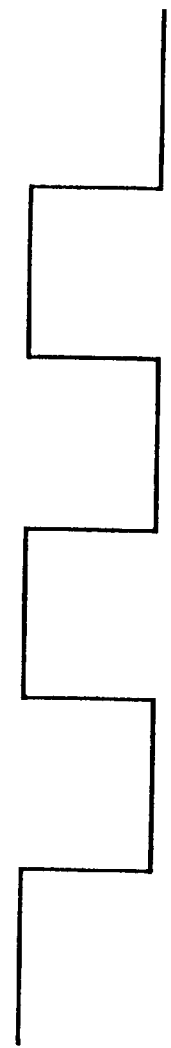
FIG. 13A
FIG. 13B

TRACKING CONTROL APPARATUS OF OPTICAL DISC APPARATUS AND METHOD OF SAME

BACKGROUND OF THE INVENTION

1. Field of the Invention

The present invention relates to an optical disc apparatus such as a compact disc apparatus (CD), CD-ROM or other optical disc apparatus, or magneto-optic disc apparatus.

Further, the present invention relates to a tracking error signal calculation circuit used in the optical disc apparatus.

2. Description of the Related Art

An optical pick-up is used for recording data or reading recorded data along a track (guide groove) of a disc recording medium of an optical disc apparatus. In the optical pick-up, optical parts such as a semiconductor laser, photodiode (PD), prism, and object lens are mounted.

At the time of recording or reading data to or from the disc recording medium, in order to eliminate the influence of the face vibration and wobbling of the track of the disc recording medium, and the face vibration and wobbling of the track by the tilting of the turntable of the disc drive, and precession motion, and the like, focusing servo control and track servo control are carried out.

In focusing servo control, the object lens for focusing (exactly focusing) the laser beam emitted from the semiconductor laser on the recording surface of the disc recording medium is positioned with respect to the surface of the disc recording medium.

In tracking servo control, the optical pick-up and object lens is positioned in the radial direction of the disc recording medium to position the laser beam emitted from the semiconductor laser at a desired track of the disc recording medium (to place it on-track).

A focus error signal is used for the focusing servo control, while a tracking error signal is used for the tracking servo control.

Usually, signals detected by two photodiodes are computed by the push-pull system to calculate the tracking error signal.

An offset will appear in the tracking error signal due to the push-pull system. When there is an offset, even if the tracking error signal indicates 0, if the tracking servo control is carried out by using that tracking error signal, the beam of light of the semiconductor laser will deviate from the center of the track, so it suffers from the disadvantage of poor control when performing the tracking control.

As factors behind the appearance of the offset in the tracking error signal, there are deviation of the optical axis of the object lens, tilting of the disc recording medium in the radial direction, an unbalance in groove shape on the disc recording medium, etc.

As the method for reducing the offset due to the above factors, a variety of countermesures have been made. For example, refer to "Optical Disc Technology", supervised by Morio Onoe, Radio Gijutsusha, page 91 to page 98.

However, the inventors of the present application found that just the above-mentioned countermeasures for reducing the offset were not sufficient and that offset still existed in the tracking error signal. Accordingly, when using a tracking error signal calculated by the conventional push-pull system, the problem is encountered that accurate and stable tracking servo control cannot be carried out in the optical disc apparatus.

Further, if a deviation occurs in the balance of the tracking error signal accompanying movement of the field of vision of the object lens, the disadvantage is encountered that tracking servo control cannot be stably carried out.

SUMMARY OF THE INVENTION

An object of the present invention is to provide a tracking control apparatus of an optical disc apparatus and a method of the same capable of accurately calculating the tracking error signal used in the optical disc apparatus.

Further, another object of the present invention is to provide a tracking control apparatus of an optical disc apparatus and a method of the same capable of stably performing the tracking servo control even if there is a deviation in the balance of the tracking error signal accompanying movement of the field of vision of the object lens.

According to a first aspect of the present invention, there is provided a tracking control apparatus of an optical disc apparatus having a light receiving means for outputting first and second received light detection signals from regions located on the two sides of a center of a track of a disc-like recording medium, calculating a tracking error signal from these signals, and performing tracking servo control by using the tracking error signal, the tracking control apparatus for an optical disc apparatus having a first calculation circuit for detecting a peak of the first received light detection signal from the light receiving means and subtracting a signal obtained by multiplying a first coefficient with the peak from the first received light detection signal to calculate a first calculation signal; a second calculation circuit for detecting a peak of the second received light detection signal from the light receiving means and subtracting a signal obtained by multiplying a second coefficient with the peak from the second received light detection signal to calculate a second calculation signal; a third calculation circuit for subtracting the second calculation signal from the first calculation signal to calculate the tracking error signal; a signal processing means for masking a half cycle of an off-track part of the tracking error signal at the time of an on-track state immediately after a sled high speed feed calculation; and a tracking servo control means for performing the tracking servo control by using the masked tracking error signal.

Preferably, the apparatus is provided with a filter circuit for passing a predetermined frequency component of a third signal comprised of the difference between the first received light detection signal and the second received light detection signal therethrough and a circuit for adding the third signal passed through the filter circuit to the first calculation signal or the second calculation signal.

Preferably, the apparatus is further provided with a selective signal adding circuit for adding a predetermined frequency component signal of the third signal to the first calculation signal and the second calculation signal or one of the same in accordance with the level of a mirror signal having an on-off level prescribed according to the on-track or detrack state.

Alternatively, the apparatus is provided with a selective signal adding circuit for adding a third signal comprised of the difference between the first received light detection signal and the second received light detection signal to the first calculation signal and the second calculation signal or one of the same in accordance with the level of a mirror signal having an on-off level prescribed according to the on-track or detrack state.

According to a second aspect of the present invention, there is provided a tracking control apparatus of an optical disc apparatus for performing reproduction and/or recording of a signal from a disc-like recording medium comprising a condensing means for condensing a light beam emitted from a light source toward the disc-like recording medium; a light receiving means for receiving the light beam reflected from the disc-like recording medium and outputting first and second received light detection signals from regions located on the two sides of the center of a signal track of the disc-like recording medium; a first computing means for calculating a first calculation signal based on the first received light detection signal detected by the light receiving means; a second computing means for calculating a second calculation signal based on the second received light detection signal detected by the light receiving means; a third computing means for calculating a tracking error signal based on the first calculation signal and the second calculation signal; a signal processing means for masking a half cycle of the off-track part of the tracking error signal at the time of transition from the off-track state to the on-track state immediately after high speed movement of the condensing means; and a tracking servo means for performing the tracking servo control of the condensing means by using this masked tracking error signal.

Preferably, the light receiving means is provided with first and second light receiving element groups each divided into a plurality of sections.

Preferably, the first computing means is a calculation circuit for detecting a peak of the first received light detection signal and subtracting a signal obtained by multiplying a first coefficient with the peak from this to calculate the first calculation signal and the second computing means is an calculation circuit for detecting a peak of the second received light detection signal and subtracting a signal obtained by multiplying a second coefficient with the peak from this to calculating the second calculation signal.

Preferably, the condensing means forms a single light spot on the disc-like recording medium.

According to a third aspect of the present invention, there is provided a tracking control method of an optical disc apparatus for calculating a tracking error signal from first and second received light detection signals respectively detected from the two side regions of the center of a track of a disc-like recording medium and using the tracking error signal for performing tracking servo control, aid tracking control method of an optical disc apparatus comprising detecting a peak of the first received light detection signal from the first received light detection signal and subtracting a signal obtained by multiplying a first coefficient with the peak from this to calculate a first calculation signal; detecting the peak of the second received light detection signal from the second received light detection signal and subtracting a signal obtained by multiplying a second coefficient with the peak from this to calculate a second calculation signal; calculating a tracking error signal by subtracting the second calculation signal from the first calculation signal; masking a half cycle of an off-track part of the tracking error signal at the time of an on-track state immediately after a sled high speed feed calculation; and performing the tracking servo control by using the masked tracking error signal.

BRIEF DESCRIPTION OF THE DRAWINGS

These and other objects and features of the present invention will become clearer from the following description of the preferred embodiments given with reference to the attached drawings, in which:

FIGS. 4A to 4C are views illustrating the calculation for detecting the tracking error signal when using the four-part photodiodes shown in FIG. 3, in which FIG. 4A shows a state of detracking to the (+) side; FIG. 4B shows an on-track state; and FIG. 4C shows a state of detracking to the (−) side;

FIGS. 13A and 13B are graphs showing an RF signal and a mirror signal;

DESCRIPTION OF THE PREFERRED EMBODIMENTS

As an embodiment of the present invention, as the optical disc apparatus, for example, a magneto-optic disc apparatus or a CD or CD-ROM or other optical disc apparatus may be mentioned. As the tracking error signal calculation circuit of the present invention, a circuit for calculating the tracking error signal used in the tracking servo control of these mini-disc apparatuses etc. may be mentioned.

First, in order to facilitate clearer understanding of the present invention, an explanation will be made of the basics of a tracking error signal used for example in a mini-disc apparatus or CD or CD-ROM or other optical disc apparatus.

Laser Coupler LC

Figure 1:
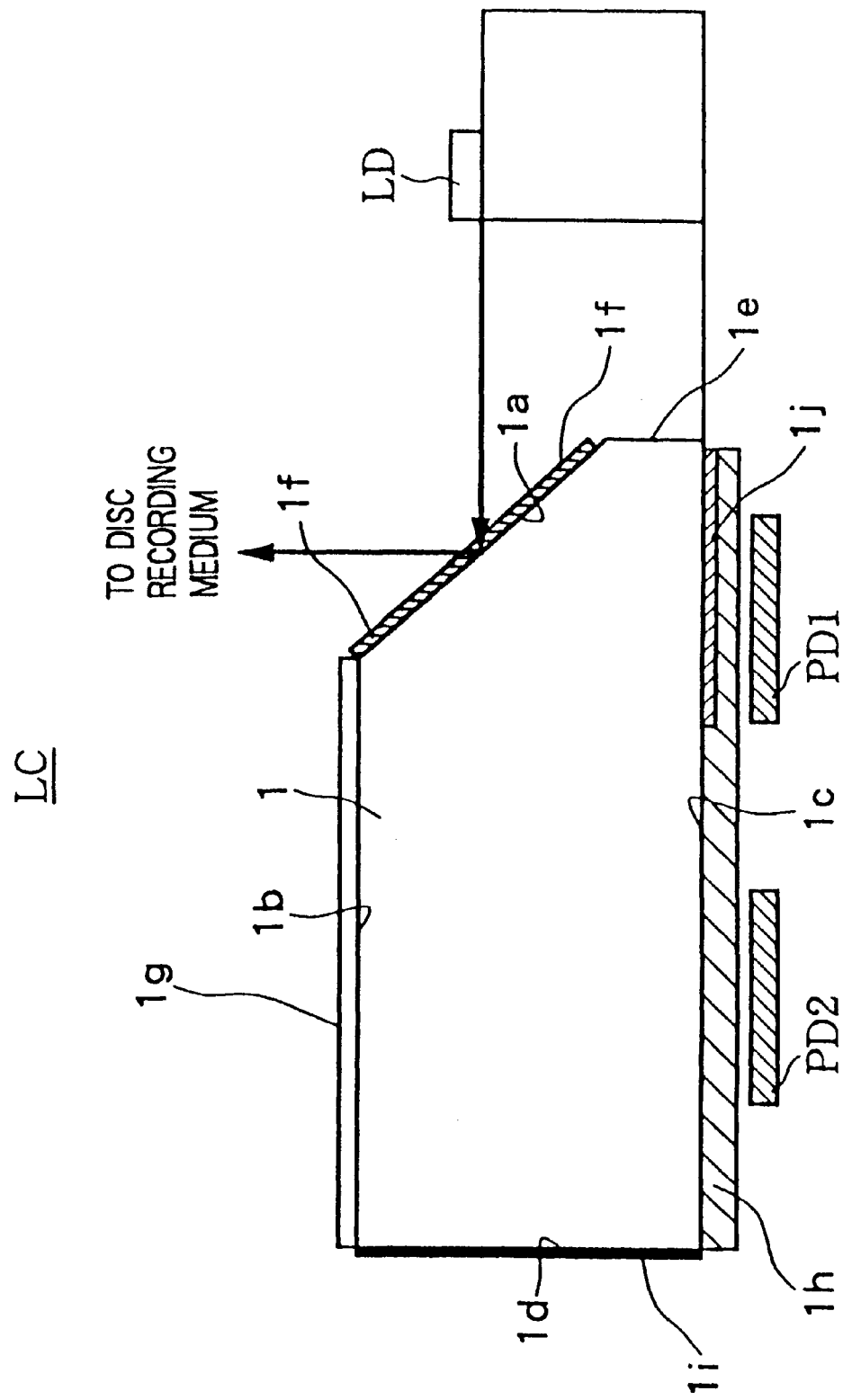
FIG. 1 is a view showing a cross-section of a laser coupler and a path of a beam with respect to a disc recording medium (not illustrated) located above the same.

FIG. 1 is a view of a cross-section of a laser coupler LC mounted on an optical pick-up and the path of a beam with the disc recording medium (not illustrated) located above it.

The laser coupler LC is provided with a semiconductor laser LD, two photodiodes PD1 and PD2, and a microprism 1.

The microprism 1 has a 45 degree inclined surface 1a for receiving the light from the semiconductor laser LD, an upper surface 1b, a lower surface 1c, and a back surface 1d. A half mirror layer 1f is coated on the 45 degree inclined surface 1a, a full reflection mirror layer 1g is coated on the upper surface 1b, an AR (anti-reflection) coating layer 1h is coated on the lower surface 1c, and a full surface absorbing film 1i is coated on the back surface 1d. Further, a half mirror layer 1j is arranged on the lower surface of the microprism 1 above where the photodiode PD1 is arranged.

The two photodiodes PD1 and PD2 are arranged at the lower surface of the microprism 1 spaced a predetermined distance from the same so as to be able to detect signals with a predetermined phase difference. The light emitted from the semiconductor laser LD is reflected at the half mirror layer 1f on the inclined surface 1a of the microprism 1 and is directed toward a not illustrated disc recording medium above this. The returned light reflected at the disc recording medium enters into the microprism 1 from the half mirror layer 1f on the inclined surface 1a of the microprism 1 and strikes the photodiode PD1 (front PD). The light reflected from there is reflected at the upper surface of the microprism 1 and strikes the photodiode PD2 (rear PD).

Three-division System Tracking Error Signal

Figure 2:
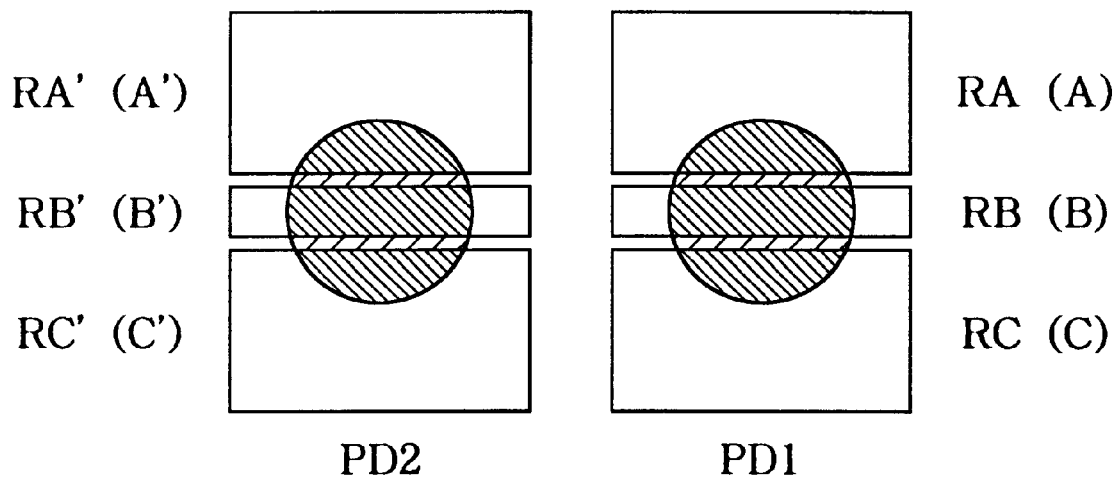
FIG. 2 is a plan view of three-part photodiodes of two photodiodes (front PD and rear PD) shown in FIG. 1.

FIG. 2 is a plan view of the three-division photodiodes used as the photodiodes PD1 and PD2 shown in FIG. 1.

The photodiodes PD1 and PD2 are respectively divided into three regions: RA, RB, and RC and RA', RB', and RC'. The regions are divided by dividing lines along a direction orthogonal to the direction in which detracking occurs. The center regions RB and RB' have the same surface areas, the regions RA and RA' on the outside thereof have the same surface areas, the regions RC and RC' have the same surface areas, and the surface areas of the regions RA and RC and regions RA' and RC' are the same. Further, the surface areas of these regions are defined so that the amount of light received at the region RB (RB') is equal to the sum of the amounts of lights received at the regions RA and RC (RA' and RC') at the time of a on-track state.

In a three-division system tracking error signal TE, the center region RB corresponds to the track center. The occurrence of detracking either above or below this region RB is detected, so in the same way as a two-part photodiode, the difference of the detection signals of the outside regions RA and RC (A−C), that is, a push-pull signal, is calculated.

Four-division System Tracking Error Signal

Figure 3:
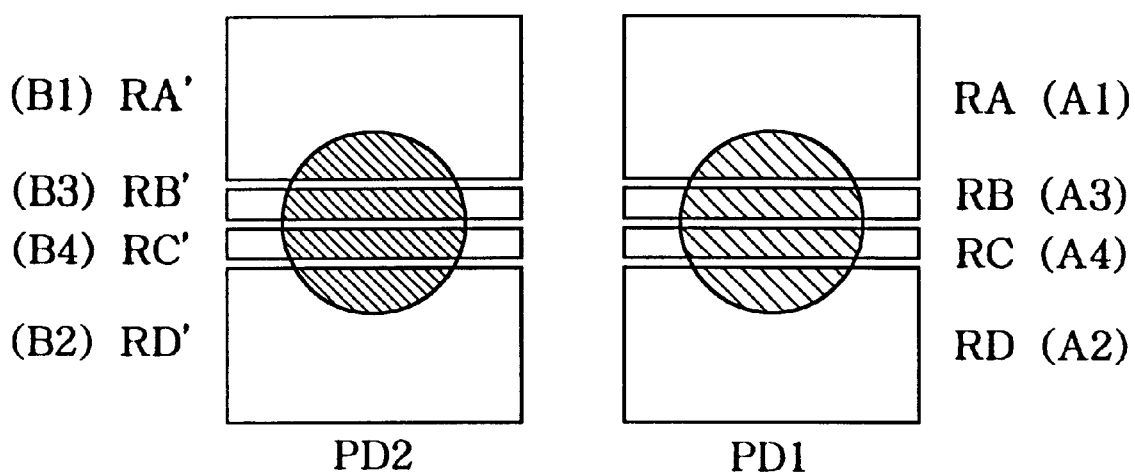
FIG. 3 is a plan view of four-part photodiodes of the photodiodes (front PD and rear PD) shown in FIG. 1.

FIG. 3 is a plan view of four-division photodiodes used as the photodiodes PD1 and PD2 shown in FIG. 1.

Referring to the photodiode PD1 (front PD), the surface areas of the center region RB and center region RC are equal, and the surface areas of the outside region RA and outside region RD are equal. The amounts of the light received at the regions RB and RC are defined so as to become the same as those of the light received at the regions RA and RD at the time of an exact focus. The signals A1, A3, A4, and A2 are detected from the regions RA, RB, RC, and RD of the front PD.

In the same way as above for the photodiode PD2 (rear PD), the surface areas of the center region RB' and center region RC' are equal, and the surface areas of the outside region RA' and outside region RD' are equal. The amounts of the light received at the regions RB' and RC' are defined so as to become the same as those of the light received at the regions RA' and RD' at the time of an exact focus. The signals B1, B3, B4, and B2 are detected from the regions RA', RB', RC', and RD' of the front PD.

FIGS. 4A to 4C are views illustrating the calculation for detecting the tracking error signal TE when using the four-part photodiodes PD1 and PD2. FIG. 4A shows a state of detracking to the (+) side; FIG. 4B shows an on-track state; and FIG. 4C shows a state of detracking to the (−) side.

Whether the apparatus is in the detrack or on-track state is judged by dividing each of the photodiodes PD1 and PD2 into two, i.e., the center left and right regions, and using the difference of the distribution of intensity of the primary diffraction light on these photodiodes PD1 and PD2. At the on-track state, the center of the divided regions of these photodiodes PD1 and PD2 is located at the center of the track.

The photodiodes PD1 and PD2 are arranged so that the detection signals from the same divided regions have an inverse phase relationship with respect to the returned light. Accordingly, the tracking error signal TE when using two photodiodes PD1 and PD2 is calculated by adding (A2+A4) and (B1+B3), which are signals having the same phase relationship, to calculate the first sum signal E, adding (A1+A3) and (B2+B4), which are signals similarly having the same phase relationship, to calculate the second sum signal F, and performing the push-pull processing of these sum signals.

In this way, signals having the same phase relationship are added so as to improve the common mode noise rejection ratio.

$$E = A2+A4+B1+B3 \quad (1)$$

$$F = A1+A3+B2+B4 \quad (2)$$

$$PP = E - F \quad (3)$$

$$= (A2 + A4 + B1 + B3) - (A1 + A3 + B2 + B4)$$

A differential amplification circuit 19 calculates the tracking error signal TE by the push-pull system shown in Equation 3.

As shown in FIG. 4B, the intensity-distributions of the two primary diffraction lights become equal at the time of an on-track state, therefore the difference thereof, i.e., the tracking error signal TE, becomes 0.

As shown in FIG. 4A or FIG. 4C, the tracking error signal TE at the time of a detracking state exhibits a polarity of either of (+) or (−) since there is no primary diffraction light in the radial direction of either of (+) or (−).

Defects of Push-pull System

Below, a description will be made of the problems (defects) of the push-pull system.

First Problem: Offset of Tracking Error Signal Due to a Shift of the Object Lens in the Radial Direction (Tracking Direction)

Figure 5:
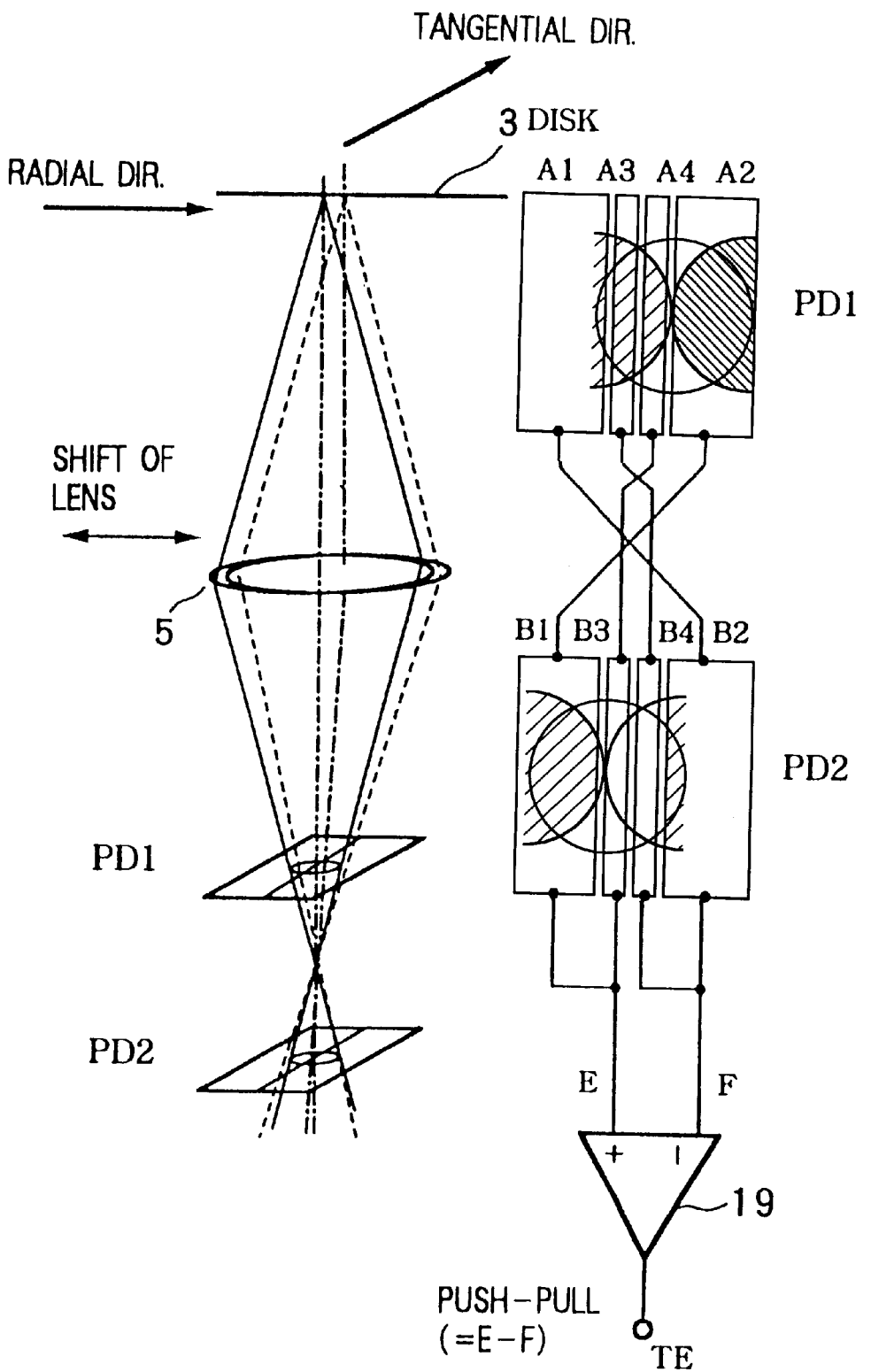
FIG. 5 is a view illustrating the push-pull signal when the object lens is deviated in a radial direction (tracking direction)

FIG. 5 is a view illustrating the push-pull signal when the object lens 5 is deviated in the radial direction (tracking direction).

When the object lens 5 shifts in the radial direction with respect to the disc recording medium 3, the returned lights on the photodiodes PD1 and PD2 are shifted as well, the intensity distributions of the photodiodes PD1 and PD2 become unbalanced, and a DC offset is caused in the push-pull signal. As a result, if the tracking servo control is performed using this push-pull signal, accurate tracking control cannot be carried out.

Second Problem: Offset of Tracking Error Signal Due to Radial Skew

Figure 6:
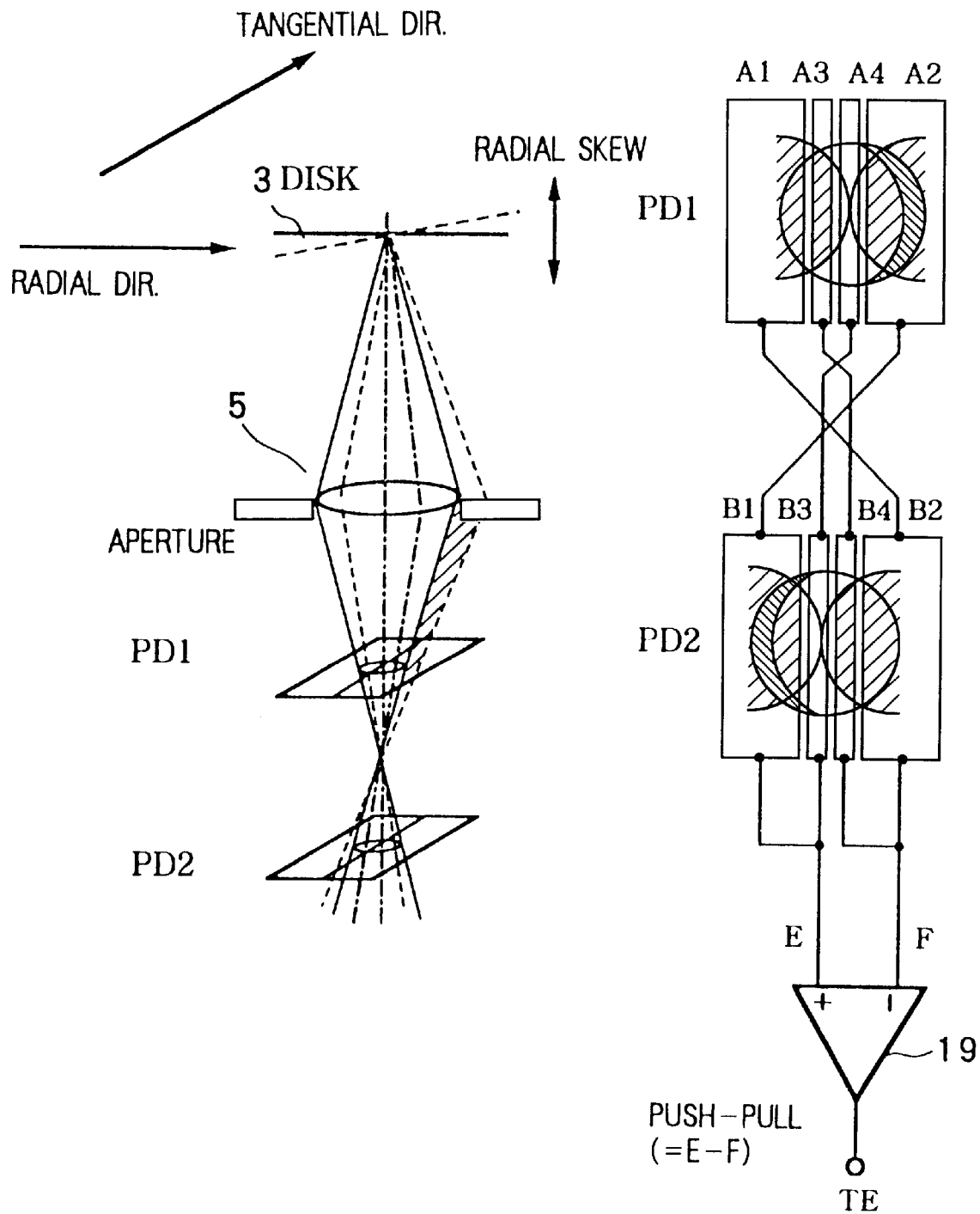
FIG. 6 is a view showing a state where the spot of the returned light on the photodiode shifts due to a radial skew of the disc recording medium.

FIG. 6 is a view of the state where the spots of the returned lights on the photodiodes PD1 and PD2 shift due to a radial skew of the disc recording medium 3.

When the disc recording medium 3 is skewed in the radial direction, the intensity distributions of the returned lights striking the photodiodes PD1 and PD2 become unbalanced and a DC offset occurs in the tracking error signal TE. As a result, when using the tracking error signal TE in this state, the tracking servo control cannot be correctly carried out.

An actual laser coupler LC rotates 45 degrees with respect to the pit. As a result, even if the disc recording medium 3 is skewed in the tangential direction, a DC offset occurs in the tracking error signal TE.

The amount of the offset becomes 1/1.41 in both of the radial direction and tangential direction since the laser coupler LC rotates by 45 degrees.

Due to the skew of the disc recording medium 3 mentioned above, in the same way as the case where the object lens 5 skews with respect to the disc recording medium 3, a DC offset will occur in the tracking error signal TE.

Principle of Present Invention: Top Hold Push-pull System

A description will be made next of the principle of the present invention for cancelling the offset due to the movement of the field of vision of the object lens explained above.

As the optical disc apparatus of the present invention, for example, a mini-disc apparatus or CD or CD-ROM apparatus may be mentioned. Further, as the tracking error signal calculation circuit of the present invention, a circuit calculating the tracking error signal used in the tracking servo control in these optical disc apparatuses may be mentioned.

Figure 7:
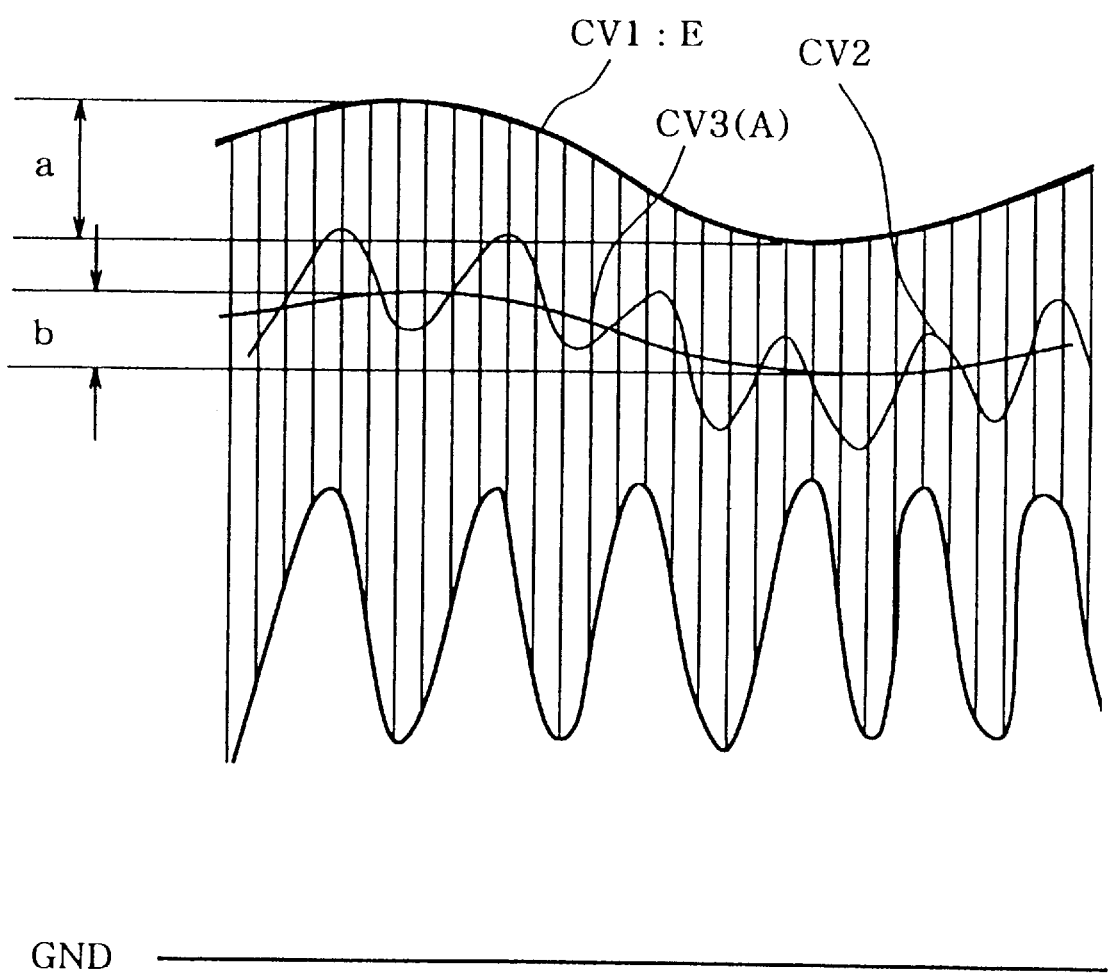
FIG. 7 is a graph showing various signal waveforms shown in FIG. 4A to FIG. 4C.

FIG. 7 is a graph showing a waveform of an RF envelope signal of the first sum signal E (=A2+A4+B1+B3) shown in FIGS. 4A to 4C and Equation 1.

A curve CV1 indicates a peak change of the RF envelope of the first sum signal E, due to the deviation of the object lens, skew, etc. The peak width is indicated as a.

A curve CV2 is a waveform of the signal when low pass filtering is applied to the tracking error signal TE used when applying the track servo control in the push-pull system.

A curve CV3 indicates the change of offset of the tracking error signal actually used. The signal thereof is defined as A, and the width thereof is defined as b.

In order to cancel the DC offset due to the shift of the object lens 5 or the skew of the disc recording medium 3, it is sufficient to subtract the offset width b indicated by the curve CV3 from the value indicated by the curve CV2.

While the description was made above of the cancellation of the offset for the first sum signal E, the same applies for the second sum signal F.

In the present invention, the push-pull signal is calculated after offsets are subtracted from the RF envelope of the first sum signal E and the RF envelope of the second sum signal F. As a result, the offset is removed from the tracking error signal.

First Embodiment: Basic Calculation and Basic Circuit

Below, a detailed description will be made of a basic circuit of the first embodiment of the present invention and the calculation thereof.

A constant K is determined so that the offset b becomes the product of the coefficient K and peak a, that is, b becomes equal to K×a, under the above conditions. Note that K<1. The signal obtained by cancelling the offset can be represented as (A−Ka). A denotes the first sum signal E or the second sum signal F. In the present invention, (A−Ka) is used for the calculation of the tracking error signal TE as the revised first sum signal or revised second sum signal.

Figure 8:
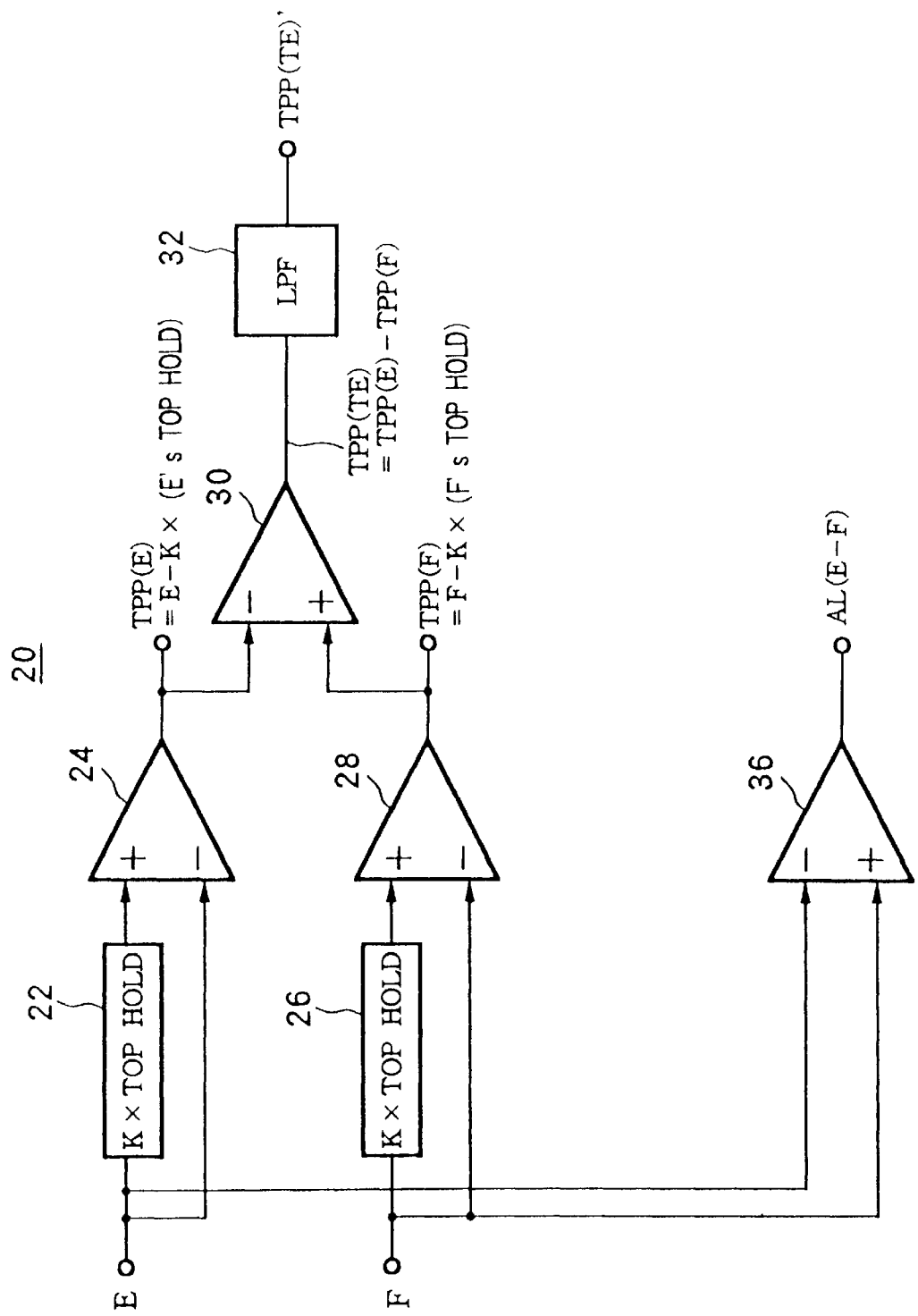
FIG. 8 is a view showing a circuit of a first embodiment for calculating the tracking error signal of the present invention.

FIG. 8 is a view of a basic circuit 20 (circuit of the first embodiment) for calculating the tracking error (TE) signal obtained by performing the offset correction mentioned above.

Figure 4:
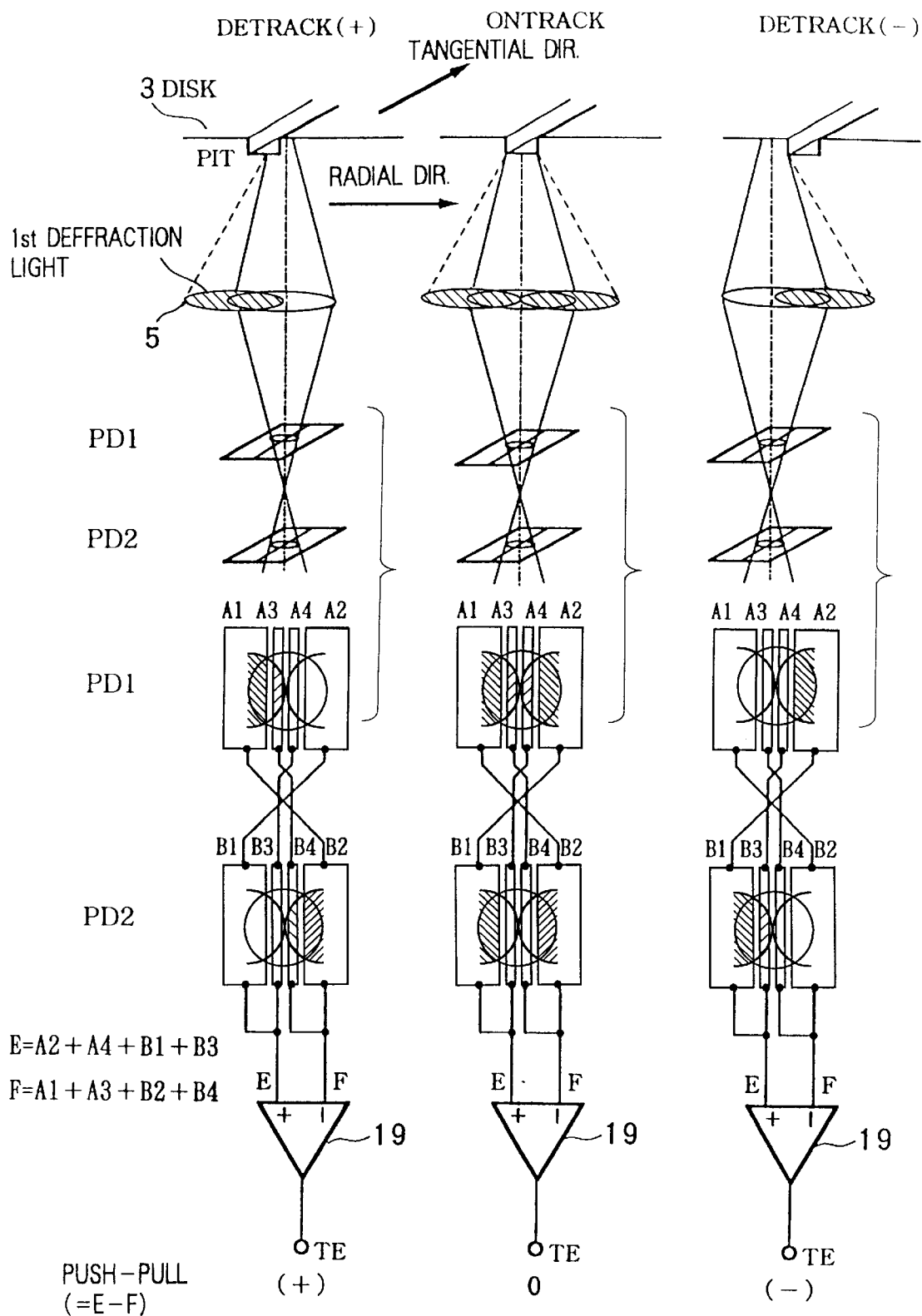

Assume that the first sum signal E and the second sum signal F are calculated at circuits including the calculation circuit 19 illustrated in FIG. 4.

The top hold push-pull (TPP) signal calculation circuit 20 shown in FIG. 8 replaces the calculation circuit 19 shown in FIGS. 4A to 4C.

This top hold push-pull (tracking error) signal calculation circuit 20 has a top hold constant multiplication circuit 22 which detects the peak a of the first sum signal E, holds this, and multiplies the constant K with the result thereof, a differential amplification circuit 24 for calculating (E−K×a), a top hold constant multiplication circuit 26 which detects the peak a' of the first sum signal F, holds this, and multiplies the constant K with it, a differential amplification circuit 28 for calculating (F−K×a'), and a differential amplification circuit 30 for performing the push-pull calculation on these calculated signals. The tracking error signal is output from the differential amplification circuit 30.

This tracking error signal calculation circuit 20 uses the peak hold constant multiplication circuits 22 and 26 for detecting the change of peak and multiplying the coefficient K with it so as to calculate (E−K×a) and (F−K×a').

(E−K×a) will be referred to as the first sum signal after top hold processing (abbreviated as the top hold first sum signal) TPP (E), and (F−K×a') will be referred to as the second sum signal after top hold processing (abbreviated as the top hold second sum signal) TPP (F), the constant K will be referred to as the TPP calculation coefficient, and the tracking error signal calculated at the circuit 30 will be referred to as the top hold tracking error signal TPP (TE). In this top hold tracking error signal TPP (TE), the offset is cancelled according to the above principle.

Further preferably, a low-pass filter circuit 32 provided in the rear of the circuit 30 is provided and a top hold tracking error signal TPP (TE), passing the low frequency component of the top hold tracking error signal TPP (TE) from the circuit 30 is provided.

In the subtraction circuit 36 of FIG. 8, an alignment signal AL obtained by subtracting the second sum signal F from the first sum signal E can be calculated. A description will be made later of the utilization of the alignment signal AL.

Circuit of Embodiment 2

Figure 9:
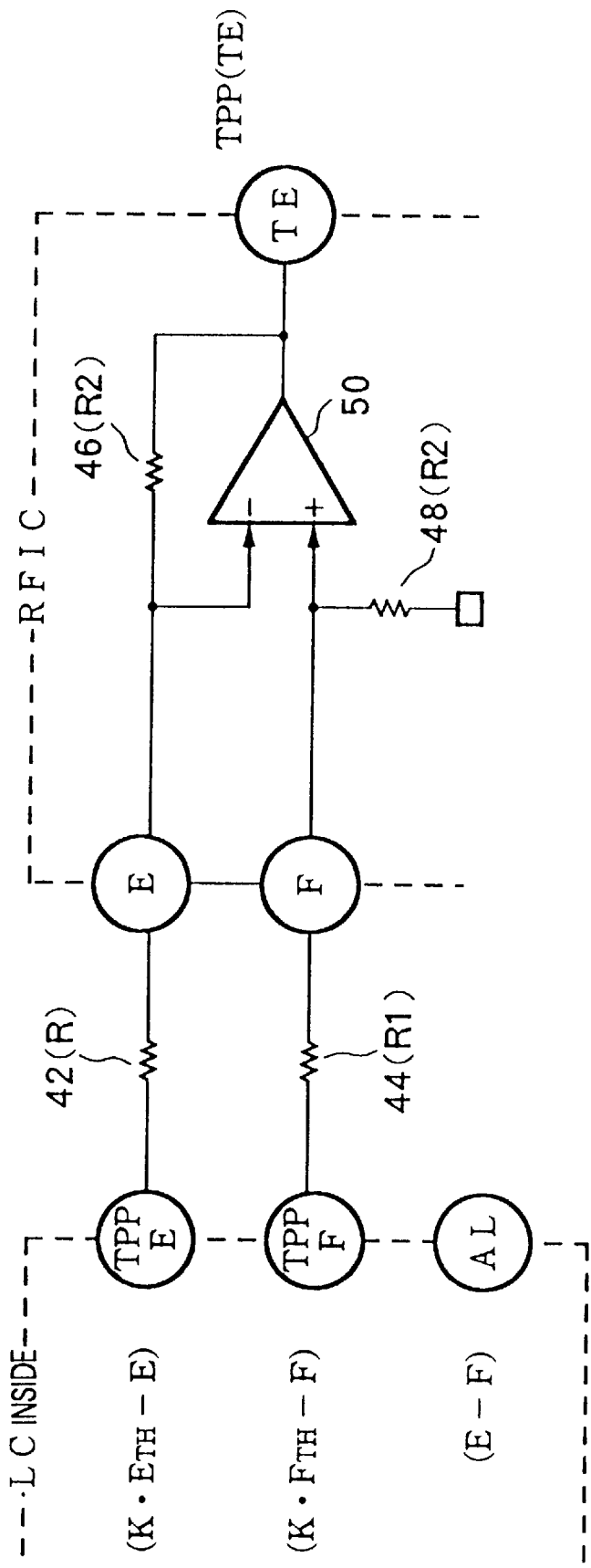
FIG. 9 is a view showing the circuit of a second embodiment for calculating the tracking error signal of the present invention.

FIG. 9 is a view of the circuit configuration of a second embodiment for calculating the top hold push-pull signal, that is, a top hold tracking error signal TPP (TE), from the top hold first sum signal TPP (E) and the top hold F signal TPP (F) obtained at the top hold push-pull signal calculation circuit 20 shown in FIG. 8.

The circuit configuration illustrated in FIG. 9 is designed considering the ease of adjustment of the final tracking error (TE) signal while making possible the output of the signal which becomes the base from the laser coupler LC as much as possible considering the fact that there are limits to the parts accommodated in the laser coupler LC.

The laser coupler LC accommodates the laser LD, photodiodes PD1 and PD2, and microprism 1 shown in FIG. 1. Further, the laser coupler LC accommodates the object lens 5 to amplification circuit 19 illustrated in FIGS. 4A to 4C and the top hold constant multiplication circuits 22 and 26, amplification circuits 24 and 28, calculation circuit 30, LPF 32, and alignment signal AL calculation circuit 36 shown in FIG. 8. Namely, the laser coupler LC calculates the top hold first sum signal TPP (TE) and the top hold second sum signal TPP (F) and further calculates (E signal–F signal) as the alignment signal AL. These signals TPP (E), TPP (F), and AL are basic output signals as the laser coupler LC.

$$TPP(E) = K \times E_{TP} - E \tag{5}$$

$$TPP(F) = K \times F_{TP} - F \tag{6}$$

$$AL = E - F \tag{7}$$

Where, $E_{TP}$ is a peak holding value of the E signal, $F_{TP}$ is a peak holding value of the F signal, and K is a TPP calculation coefficient (K<1).

At the time of calculation of the final tracking error (TE) signal, there is a high possibility of adjustment of gain. Therefore, resistors 42 and 44 having a resistance value R1 and a radio frequency integrated circuit RFIC are provided at the outside of this laser coupler LC. The radio frequency integrated circuit RFIC is provided with a differential amplification circuit 50, a negative feedback resistor 46 thereof, and a resistor 48. The resistance values of the negative feedback resistor 46 and the resistor 48 are R2.

The top hold tracking error signal TPP (TE) is represented by the following equation:

$$TPP(TE) = (R2/R1) \times [(K \times F_{TP} - F) - (K \times E_{TP} - E)] \tag{8}$$

$$= (R2/R1) \times [(E - F) - K(E_{TP} - F_{TP})]$$

In the circuit of FIG. 9, if the resistance values R1 and R2 are appropriately adjusted at the outside of the laser coupler LC, the gain can be changed and a top hold tracking error signal TPP (TE) in which the gain is appropriately adjusted can be provided.

Actual Signal Processing Circuit of Laser Coupler LC

Figure 10:
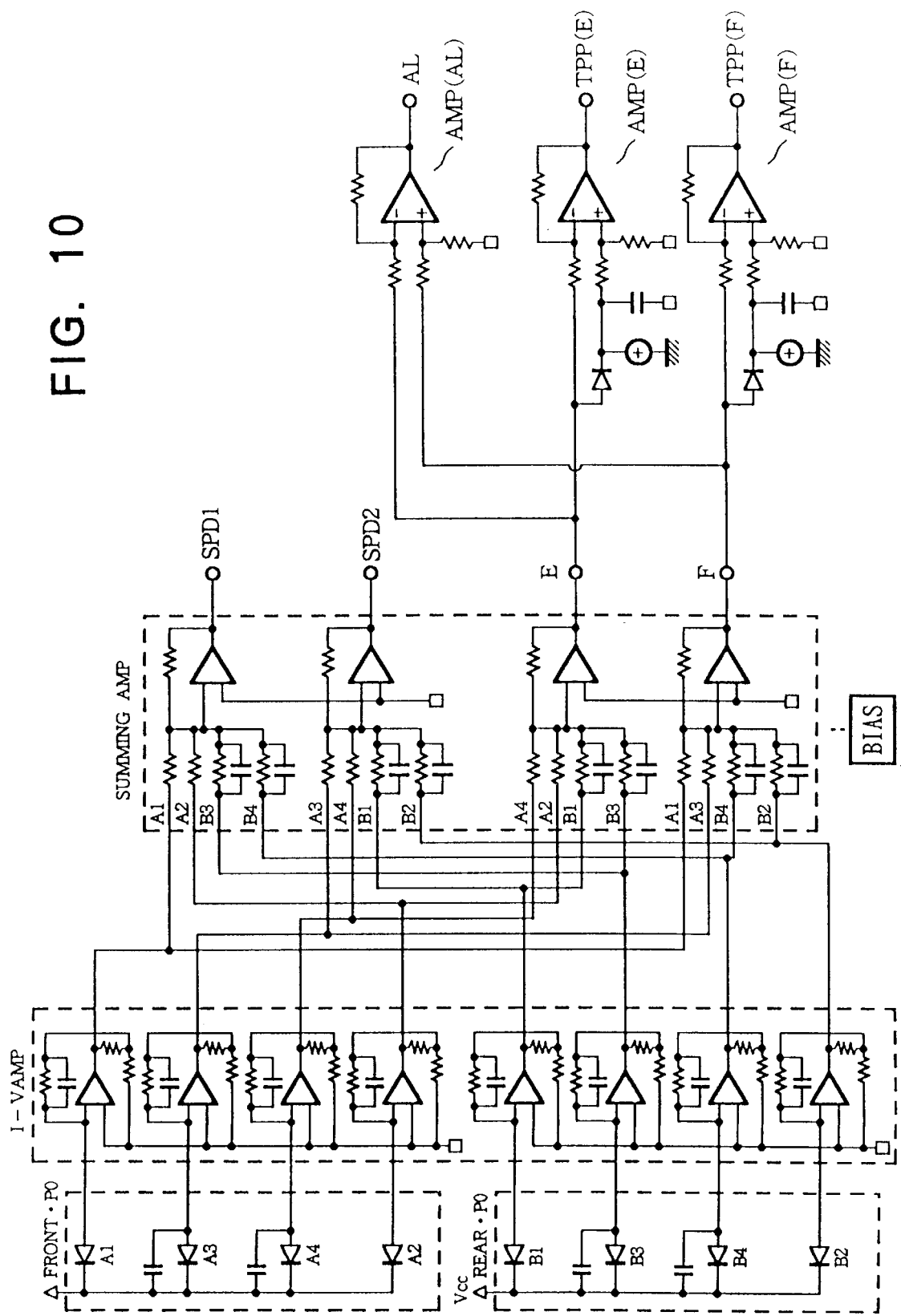
FIG. 10 is a view of an actual circuit configuration of a signal processing circuit in a laser coupler LC.

FIG. 10 is a view of the circuit configuration of an actual signal processing circuit in the laser coupler LC.

The detection signals from the front PD and rear PD are respectively amplified up to the predetermined signal levels in a current/voltage conversion and amplification circuit I-VAMP accommodating a current/voltage (I/V) conversion circuit and an amplification circuit (AMP). The above signals, SPD1, SPD2, E, and F are calculated at a sum calculational amplification circuit SUMMING AMP. Further, the alignment signal AL is calculated in the calculational amplification circuit AMP (AL), the top hold first sum signal TPP (E) is calculated in the calculational amplification circuit AMP (E), and the top hold second sum signal TPP (F) is calculated in the calculational amplification circuit AMP (F).

In the sum calculation circuit SUMMING AMP, a bias is added from a bias circuit BIAS.

Circuit of Embodiment 3

Figure 11:
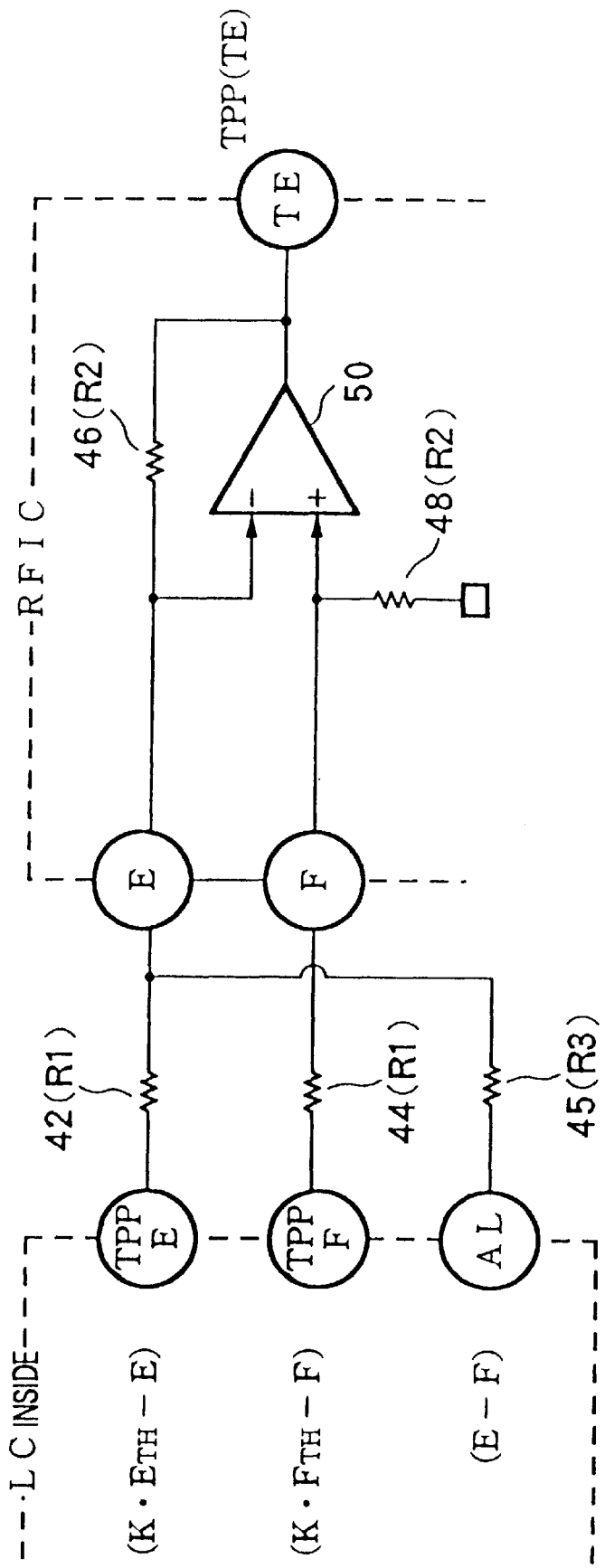
FIG. 11 is a view showing the circuit of a third embodiment for calculating the tracking error signal of the present invention.

FIG. 11 is a view of the circuit configuration of a third embodiment for calculating the top hold tracking error (TPP (TE)) signal from the top hold first sum signal TPP (E) and the top hold second sum signal TPP (F) obtained at the top hold push-pull signal calculation circuit 20 shown in FIG. 8.

The circuit of FIG. 11 is a circuit for substantially changing the TPP calculation coefficient in the circuit illustrated in FIG. 9.

The laser coupler LC shown in FIG. 1, as shown in FIG. 8 and FIG. 11, outputs the top hold first sum signal TPP (E), the top hold second sum signal TPP (F), and the alignment signal AL.

In order to calculate the top hold tracking error signal TPP (TE), resistors 42 and 44 of a resistance value R1, a resistor 45 of a resistance value R3, and the radio frequency integrated circuit RFIC are provided outside of the laser coupler LC. The differential amplification circuit 50, the negative feedback resistor 46 thereof, and a positive feedback resistor 48 are provided in the radio frequency integrated circuit RFIC. The resistance values of the negative feedback resistor 46 and the positive feedback resistor 48 are R2.

In the circuit illustrated in FIG. 11, a resistor 45 of a resistance value R3 for adding the alignment signal AL to the top hold first sum signal TPP (E) and applying the same to the inversion terminal (−) of the amplification circuit 50 is added to the circuit illustrated in FIG. 9.

The top hold tracking error signal TPP (TE) is represented by the following equation:

$$TPP(TE) = (R2/R1) \times [(E - F) - K(E_{TP} - F_{TP})] - \tag{9}$$

$$(R2/R3)(E - F)$$

$$= (R2/R1) \times [(E - F) - (R2/R3)(E - F)]$$

$$= -(R2/R1)[K(E_{TP} - F_{TP})]$$

$$= [(R2(R3 - R2))/(R1R3)](E - F) - K_1'(E_{TP} - F_{TP})]$$

Where, $K_1' = (R3(R3-R2) \times K$.

The circuit illustrated in FIG. 11 has the advantage that the TPP calculation coefficient K can be made larger when compared with the circuit illustrated in FIG. 9 since the constant (coefficient) which becomes $K_1' = (R3/(R3-R2) \times K$ is multiplied with $(E_{TP} - F_{TP})$.

The optimum value of the TPP calculation coefficient K is different according to the optical disc apparatus due to inherent variations in characteristics of individual optical disc apparatuses. However, the TPP calculation coefficient is set constant in the laser coupler LC, therefore is usually fixed for all optical disc apparatuses of the same model. Therefore, in the adjustment stage, where it is desired to change the same to the optimum TPP calculation coefficient K (where it is desired to make the coefficient K large in the present embodiment), when adopting the circuit configuration of FIG. 11, there is an advantage that the change becomes possible outside of the laser coupler LC.

Further, it is also possible to set the outer attached resistors 42, 44 and 45 of the laser coupler LC and the radio frequency integrated circuit RFIC as variable resistors and to adjust their resistance values to appropriately adjust the TPP calculation coefficient K, in other words, the gain of the top hold first sum signal TPP (E).

The resistors 46 and 48 illustrated inside the radio frequency integrated circuit RFIC in FIG. 11 can be provided outside as well. This is because not only does the provision of the resistors 46 and 48 outside of the radio frequency integrated circuit RFIC make the gain adjustment resistors variable and raise the degree of freedom of the gain adjustment, but also there are cases where it is not preferred to include the resistors 46 and 48 having large resistance values in the IC circuit of the radio frequency integrated circuit RFIC.

Circuit of Embodiment 4

Figure 12:
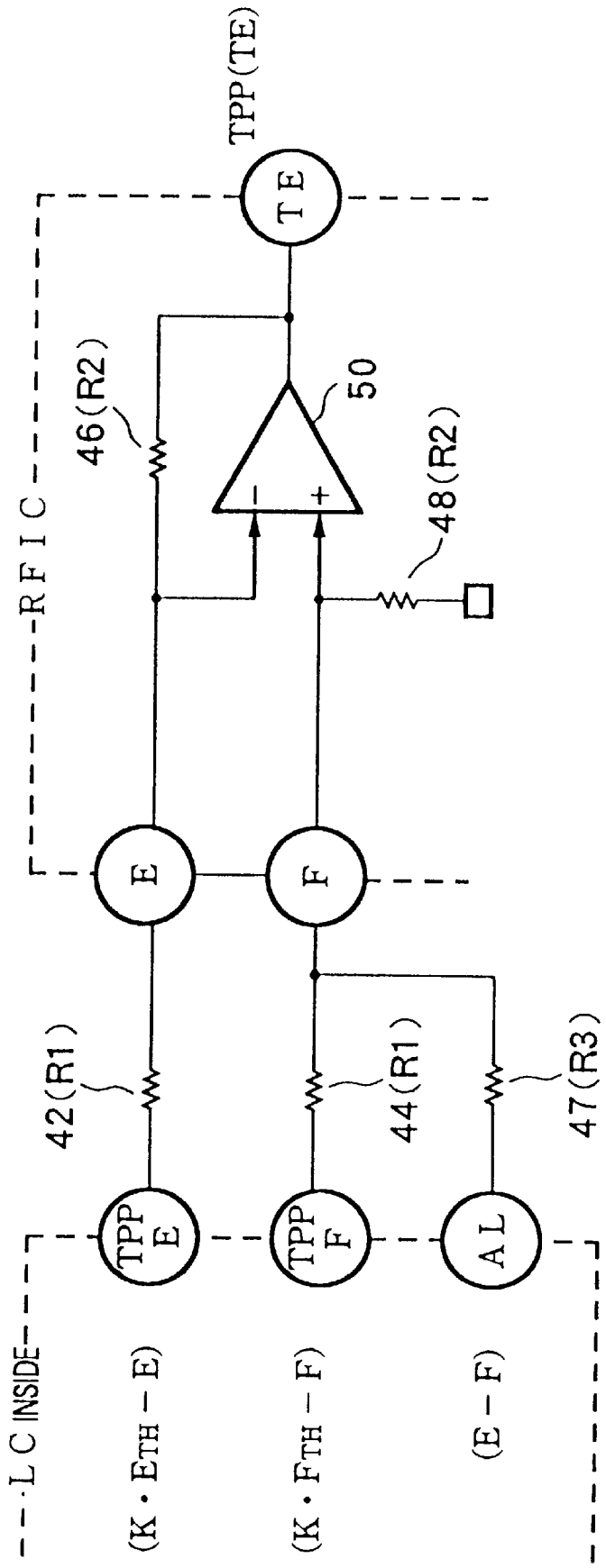
FIG. 12 is a view showing the circuit of a fourth embodiment for calculating the tracking error signal of the present invention.

FIG. 12 is a view of the circuit configuration of a fourth embodiment for calculating the top hold tracking error (TPP (TE)) signal from the top hold first sum signal TPP (E) and the top hold second sum signal TPP (F) obtained at the top hold push-pull signal calculation circuit 20 shown in FIG. 8.

The circuit of FIG. 12 is a circuit enabling the TPP calculation coefficient in the circuit illustrated in FIG. 9 to be made small.

The optimum value of the TPP calculation coefficient K differs according to the optical disc apparatus due to inherent variations of characteristics of individual optical disc apparatuses. However, the TPP calculation coefficient is set constant in the laser coupler LC, therefore is usually fixed for all optical disc apparatuses of the same model. Therefore, in the adjustment stage, where it is desired to change the same to the optimum TPP calculation coefficient K (where it is desired to make the coefficient K large in the present embodiment), the circuit configuration of FIG. 12 is adopted.

The laser coupler LC outputs the top hold first sum signal TPP (E), top hold second sum signal TPP (F), and alignment signal AL.

In order to calculate the top hold tracking error signal TPP (TE), resistors 42 and 44 of a resistance value R1, a resistor 47 of a resistance value R3, and the radio frequency integrated circuit RFIC are provided outside of the laser coupler LC. The differential amplification circuit 50, the negative feedback resistor 46 thereof, and the positive feedback resistor 48 are provided in the radio frequency integrated circuit RFIC. The resistance values of the negative feedback resistor 46 and the positive feedback resistor 48 are R2.

In the circuit illustrated in FIG. 12, a resistor 45 of the resistance value R3 for adding the alignment signal AL to the top hold second sum signal TPP (F) and applying the same to the non-inversion terminal (+) of the amplification circuit 50 is added to the circuit illustrated in FIG. 9.

The top hold tracking error signal TPP (TE) is represented by the following equation:

$$\begin{aligned}TPP(TE) &= (R2/R1) \times [(E-F) - K(E_{TP} - F_{TP})] + \\ &\quad (R2/(R3+R2)(1+R2/R1)(E-F) \\ &= [(R2/R1(R1+2R2+R3)/(R2+R3)]/(R1R3) \times \\ &\quad [(E-F) - K_2'(E_{TP} - F_{TP})]\end{aligned} \quad (10)$$

Where, $K_2' = [(R2+R3)]/(R1+2R2+R3)] \times K$.

The circuit illustrated in FIG. 12 has the advantage that the TPP calculation coefficient K can be made smaller compared with the circuit illustrated in FIG. 9 since the constant (coefficient) which becomes $K_2' = (R2+R3)]/(R1+2R2+R3) \times K$ is multiplied with $(E_{TP} - F_{TP})$.

It is also possible to set the outer attached resistors 42, 44, and 47 of the laser coupler LC and the radio frequency integrated circuit RFIC as variable resistors and adjust their resistance values to appropriately adjust the gain of the top hold second sum signal TPP (F). By providing the resistors 42, 44, and 47 outside of the laser coupler LC and the radio frequency integrated circuit RFIC in this way, the adjustment of the gain becomes easy.

The resistors 46 and 48 illustrated inside the radio frequency integrated circuit RFIC in FIG. 12 can be provided outside as well as mentioned by referring to FIG. 11. Namely, this is because not only does the provision of the resistors 46 and 48 outside of the radio frequency integrated circuit RFIC make the gain adjustment resistors variable and raise the degree of freedom of the gain adjustment, but also there are cases where it is not preferred to include the resistors 46 and 48 having a large resistance value in the IC circuit of the radio frequency integrated circuit RFIC.

Circuit of Embodiment 2 to Circuit of Embodiment 4

The circuit of Embodiment 2 shown in FIG. 9 shows the basic circuit for calculating the top hold tracking error signal TPP (TE).

The circuit of Embodiment 3 shown in FIG. 11 can be used when making the TPP calculation coefficient K large from the outside of the laser coupler LC and RFIC.

The circuit of Embodiment 4 shown in FIG. 12 can be used when making the TPP calculation coefficient K small from the outside of the laser coupler LC and RFIC.

Further, in order to make it possible to make the TPP calculation coefficient K large and small from the outside of the laser coupler LC and RFIC, the resistor 42 and/or resistor 44 may be replaced by variable resistors thereby making it possible to change the amplification rate of the differential amplification circuit 50 in the RFIC.

Circuit of Fifth Embodiment: Circuit Considering Tracking State

FIGS. 13A and 13B are graphs showing the RF signal and the mirror signal MIRR indicating the on-track or detrack state according to the value of this RF signal. The mirror signal MIRR is at a low level at the time of the on-track state and high level at the time of a detrack state. In short, the mirror signal MIRR indicates whether the apparatus is in the on-track or detrack state.

Figure 14:
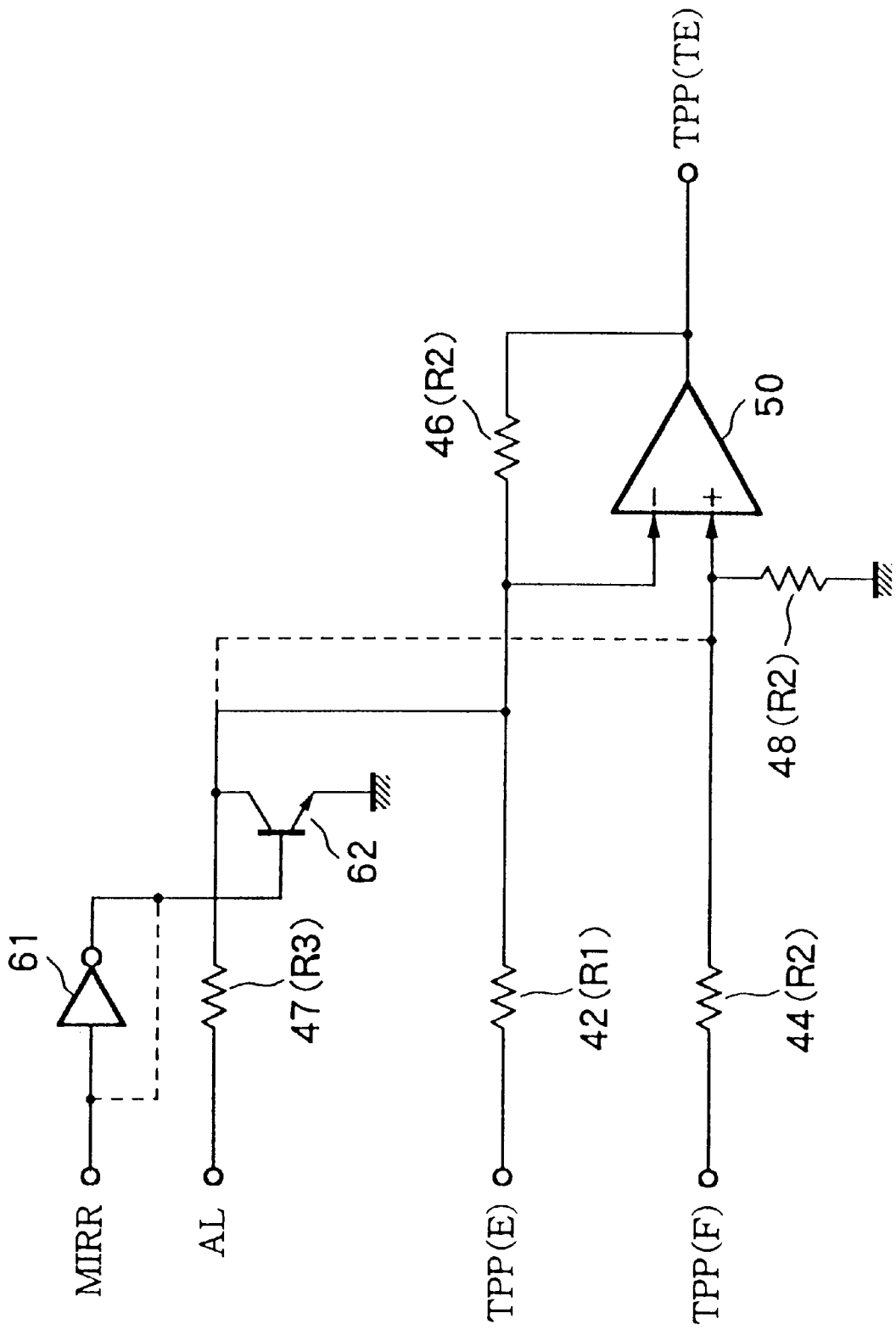
FIG. 14 is a view showing the circuit of a fifth embodiment for calculating the tracking error signal of the present invention.

FIG. 14 shows a circuit obtained by adding an inverter 61 and a transistor 62 to the tracking error signal calculation circuit shown in FIG. 11. As mentioned above, the tracking error signal calculation circuit illustrated in FIG. 11 is a circuit for making the value of the TPP calculation coefficient small with respect to the circuit illustrated in FIG. 8 by adding the alignment signal AL to the first sum signal TPP (E).

At the time of an off-track state, the mirror signal MIRR is at a high level, therefore the transistor 62 is turned off by the mirror signal inverted at the inverter 61, and the alignment signal AL is added to the first sum signal TPP (E). As a result, the value of the TPP calculation coefficient becomes small. This state is the same state as that of the circuit illustrated in FIG. 11.

At the time of an on-track state, the mirror signal MIRR is at a low level, therefore the transistor 62 is turned on by the mirror signal inverted at the inverter 61, and the alignment signal AL is not added to the first sum signal TPP (E). As a result, the value of the TPP calculation coefficient does not change. This state is the same state as that of the circuit illustrated in FIG. 8.

When adjusting the TPP calculation coefficient K to 0.80 at the time of the on-track state and the TPP calculation coefficient K to 0.68 at the time of the on-track state, conversely considering, when adjusting the TPP calculation coefficient to 0.68 at the time of the off-track state and 0.80 at the time of the on-track state, it can be considered that the tracking speed can be made shorter at the on-track state than that at the off-track state.

Particularly, for example, in a CD-ROM drive performing 4× speed calculation, the tracking can be carried out quickly.

Modification of Fifth Embodiment

As indicated by the broken lines in FIG. 14, when constituting the circuit so that the transistor 62 is made to perform on-off calculation by the mirror signal MIRR without going through the inverter 61 and so that the alignment signal AL is added or not added to the second sum signal TPP (F), it is possible to switch to the circuit state illustrated in FIG. 9 and the circuit state illustrated in FIG. 12.

In this case, conversely to the above state, at the time of a detrack state, the alignment signal AL is not added to the second sum signal TPP (F) and the value of the TPP calculation coefficient is maintained. At the time of an on-track state, the alignment signal AL is added to the second sum signal TPP(F) and the value of the TPP calculation coefficient becomes substantially large. Also in this case, the TPP calculation coefficient K is adjusted to become 0.80 at the time of the on-track state and the TPP calculation coefficient K is adjusted to become 0.68 at the time of the detrack state.

Figure 15:
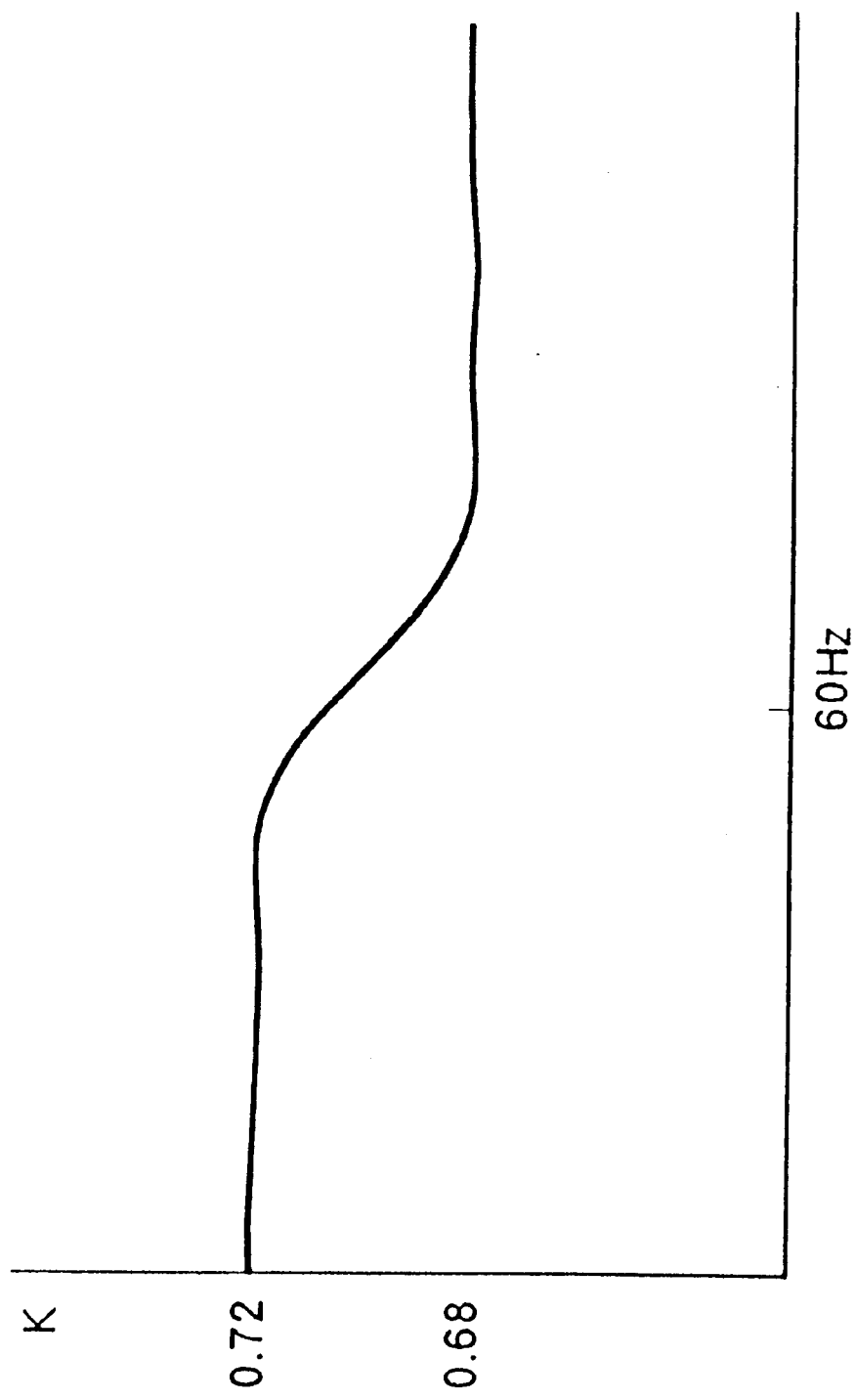
FIG. 15 is a graph illustrating a frequency dependency of a TPP calculation coefficient concerning a sixth embodiment of the tracking error signal calculation circuit of the present invention.

Circuit of Sixth Embodiment: Circuit Obtained by Adding Frequency Dependency of the TPP Calculation Coefficient FIG. 15 is a graph illustrating the relationship between the frequency and the TPP calculation coefficient.

In the circuit illustrated in FIG. 11 or FIG. 12, by adding the alignment signal AL to the top hold first sum signal TPP (E) or the top hold second sum signal TPP (F) through a low-pass filter, the TPP calculation coefficient K can be changed in accordance with the frequency band. For example, the TPP calculation coefficient K is set to 0.68 at 60 Hz or more, and the TPP calculation coefficient K is raised to 0.72 at 60 Hz or less.

By changing the TPP calculation coefficient in accordance with the frequency band in this way, the tracking calculation can be carried out according to the frequency. In the above example, the value of the TPP calculation coefficient becomes large in the low frequency band of 60 Hz or less, therefore the tracking calculation becomes quicker than that at 60 Hz or more.

In the sixth embodiment as well, there is an advantage that the TPP calculation coefficient can be adjusted outside of the laser coupler LC.

The circuit configuration of the sixth embodiment will be explained later referring to FIG. 16. Further, a detailed circuit thereof will be explained referring to FIG. 17.

Circuit of Seventh Embodiment: Circuit of Combination of Fifth Embodiment and Sixth Embodiment FIG. 16 is a view of the circuit configuration of a seventh embodiment of the tracking error signal calculation circuit of the optical disc apparatus of the present invention.

Figure 16:
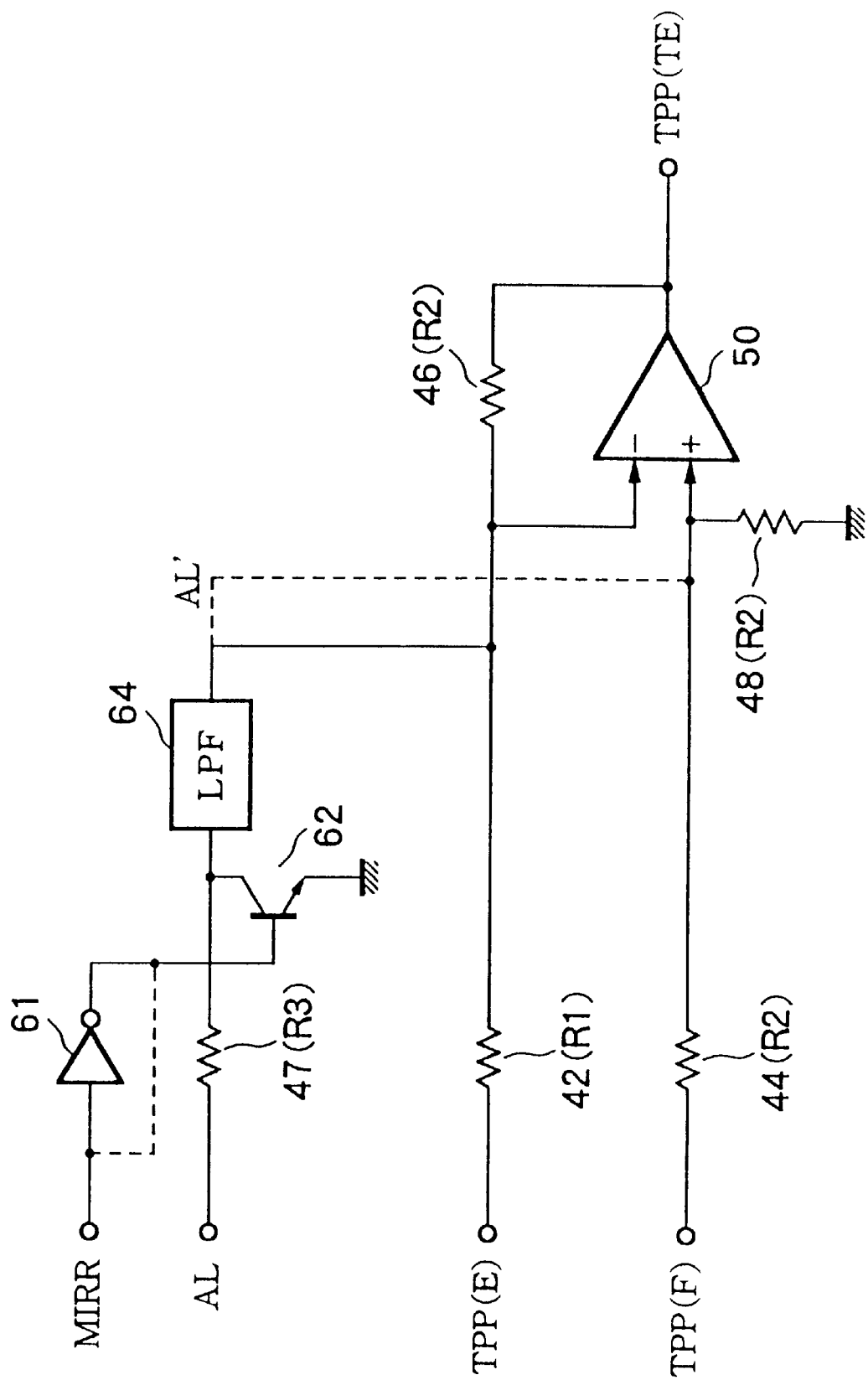
FIG. 16 is a view showing the circuit of a seventh embodiment for calculating the tracking error signal of the present invention.

The tracking error signal calculation circuit of FIG. 16 is a circuit obtained by adding the low-pass filter circuit 64 of part of the sixth embodiment to the circuit of FIG. 14 exemplified as the fifth embodiment.

The low frequency component AL' is extracted from the alignment signal AL at the low-pass filter circuit 64. When the low frequency component AL' is applied to the top hold first sum signal TPP (E) or the top hold second sum signal TPP (F), as in the sixth embodiment explained referring to FIG. 15, the TPP calculation coefficient will be changed in accordance with the frequency band.

Further, an alignment signal addition selection use transistor 62 turning on and off in accordance with the level of the mirror signal MIRR for allowing or prohibiting the addition of the alignment signal AL' of the low frequency component passed through the low-pass filter circuit 64 is provided. Accordingly, while the TPP calculation coefficient is 0.72 when the frequency band is for example 60 Hz or less, the value thereof can be further changed according to whether the apparatus is in the on-track or detrack state. Similarly, while the TPP calculation coefficient is 0.68 at 60 Hz or more, the value thereof can be further changed according to whether the apparatus is in the on-track or detrack state.

As a result, when the apparatus is in the on-track state, the tracking time can be shortened by making the TPP detection coefficient, which is set at the optimum level in a certain frequency band, larger.

Circuit of Eighth Embodiment

In an eighth embodiment of the present invention, the tracking error signal TPP (TE) calculated by either of the above embodiments is forcibly reduced to the half cycle, center voltage VC when the mirror signal is at a high level, that is, at the time of a detrack state, so as to generate a hysteresis tracking error signal TEh. The tracking servo control is carried out by using this hysteresis tracking error signal TEh.

The detailed circuit thereof will be explained by referring to FIG. 19, but before this, a description will be made of the principle of the eighth embodiment of the present invention by referring to FIG. 17 and FIG. 18.

Figure 17:
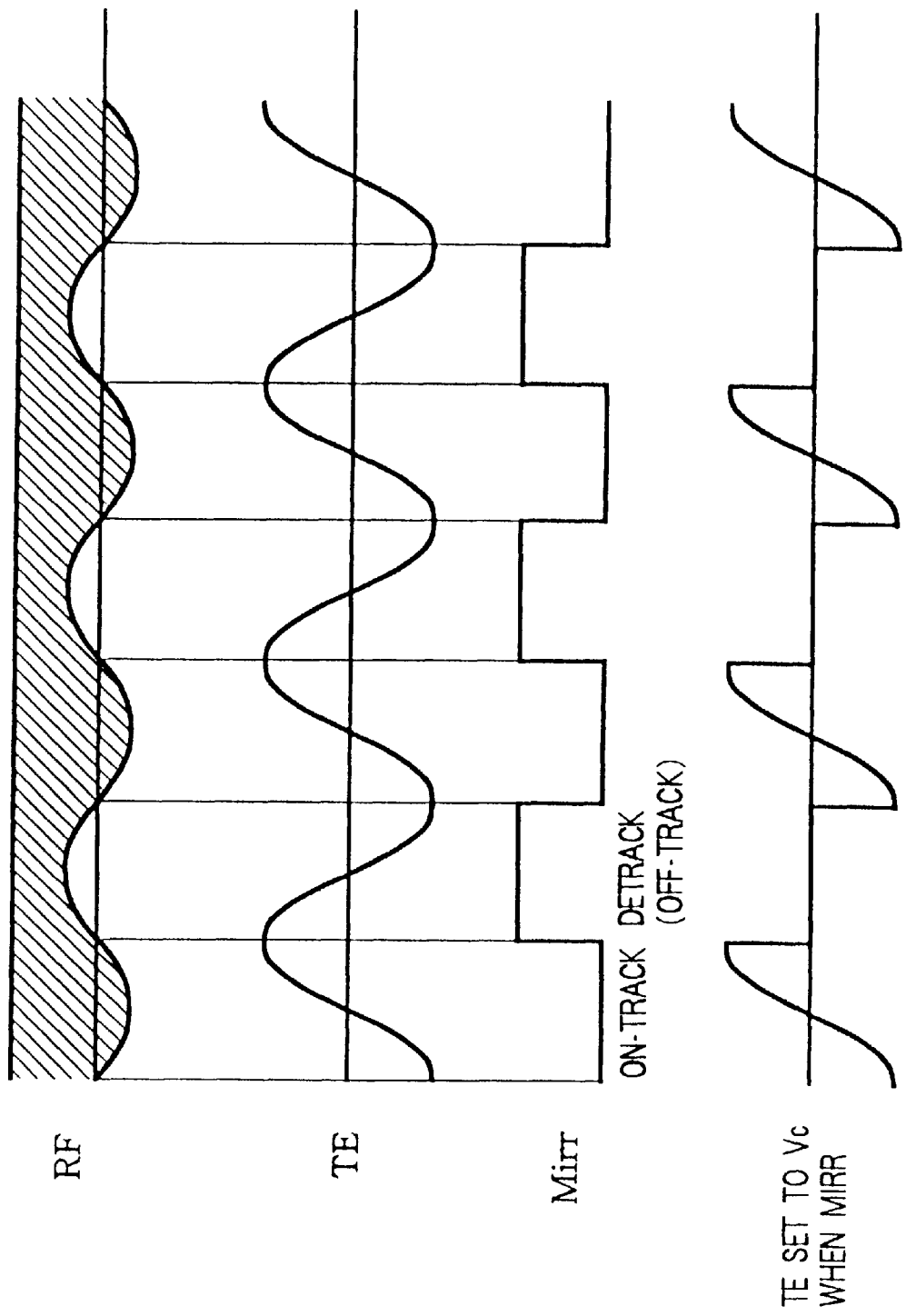
FIG. 17 is a signal waveform diagram for explaining a problem concerning an eighth embodiment of the present invention.

FIG. 17 is a signal waveform diagram for explaining the problem relating to the eighth embodiment of the present invention.

The relationship between the RF signal and the mirror signal is the same as the relationship illustrated in FIG. 13. Namely, at the time of the on-track state, the mirror signal is at a low level, and at the time of a detrack (off-track) state, the mirror signal is at a high level. The tracking error signal TE lags a half cycle behind the RF signal. A nonlinear tracking error signal TEh exhibiting a hysteresis waveform obtained by masking the half cycle of the off-track part is a signal dropped to the center voltage VC, for example VC=0, when the mirror signal is at a high level, that is, the apparatus is in the detrack state.

The advantage of use of the nonlinear tracking error signal TEh for the tracking servo control will be explained below by referring to FIG. 18.

Figure 18:
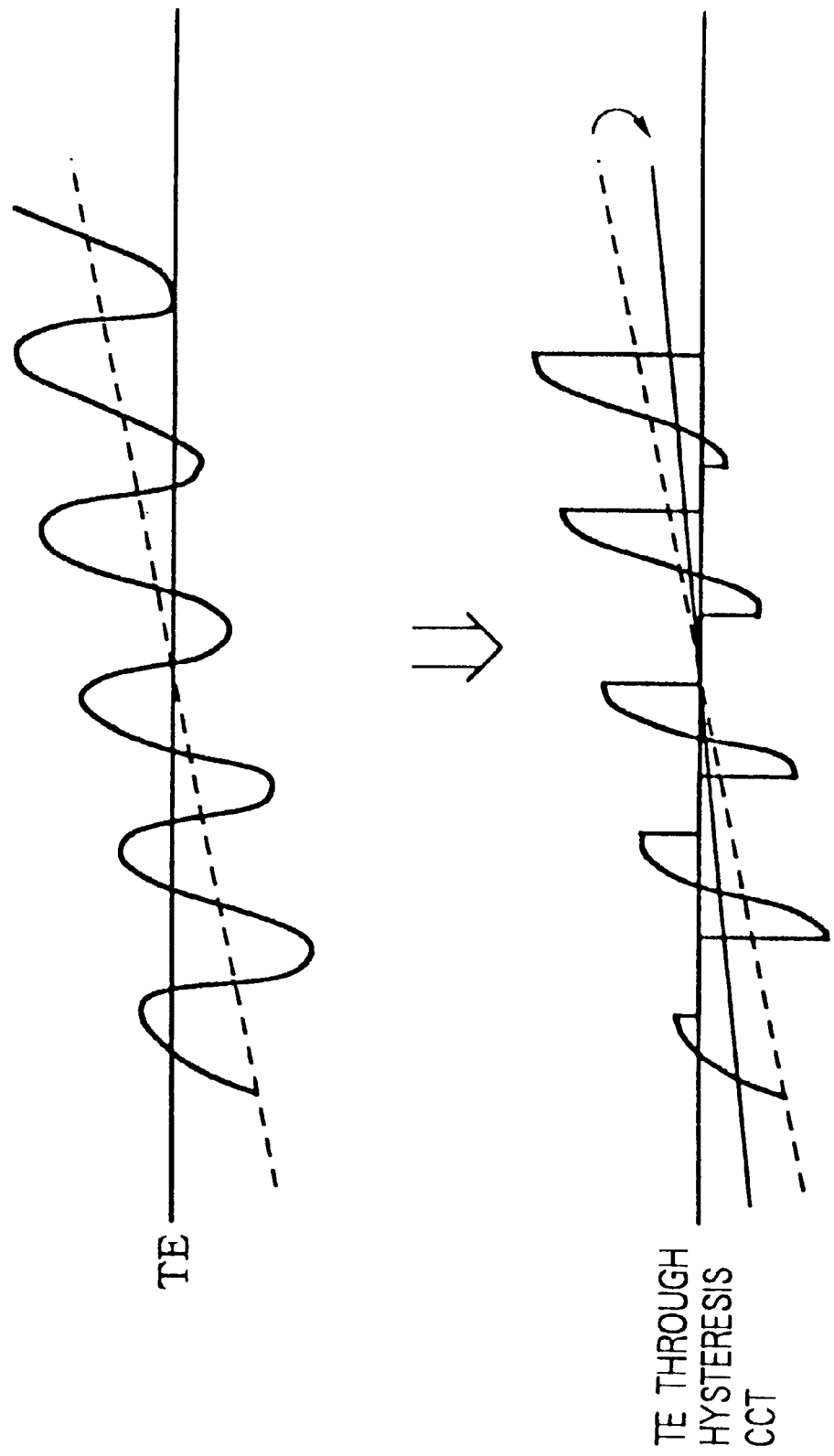
FIG. 18 is a view illustrating a relation between the tracking error signal TE and a nonlinear tracking error signal TEh when there is a movement of the field of vision of the object lens concerning the eighth embodiment of the present invention.

FIG. 18 is a view illustrating the relation between the tracking error signal TE when there is a movement of the field of vision of the object lens 5 and the nonlinear tracking error signal TEh obtained by masking the half cycle of the off-track part.

Where there is a deviation in the balance in the tracking error signal TE due to the movement of the field of vision of the object lens 5, if the tracking servo control is carried out by using this tracking error signal TE, the error is accumulated and the positional deviation of the tracking control becomes large. As a result, there is a possibility of oscillation in the tracking servo control. A major cause of this oscillation has been believed to be the movement of the field of vision of the object lens 5.

In order to overcome this problem, the nonlinear tracking error signal TEh is used. Namely, the nonlinear tracking error signal TEh obtained by masking the half cycle of the off-track part falls to the VC voltage level in a half cycle when the mirror signal is at a high level, that is, the apparatus is in the detrack state, therefore even if the error is accumulated, it does not become more than a half of that of the case where the tracking error signal TE is used. In other words, it is equivalent to the case where the deviation of the tracking error balance becomes a half. Accordingly, when the nonlinear tracking error signal TEh is used, oscillation does not occur in the tracking servo control and the control becomes stable.

Note that the tracking servo control using the nonlinear tracking error signal TEh is preferably carried out when the first fine positioning control (fine search) is switched to immediately after the coarse positioning search calculation (coarse search). Particularly, only at the time of the on-track state immediately after the high speed feeding of the sled when the mirror signal is at a high level is the track servo control carried out by using the nonlinear tracking error signal TEh obtained by masking the tracking error signal TE calculated by either of the above embodiments: desirably, TPP (TE) by the half cycle of the off-track part.

Concrete Circuit Configuration

Figure 19:
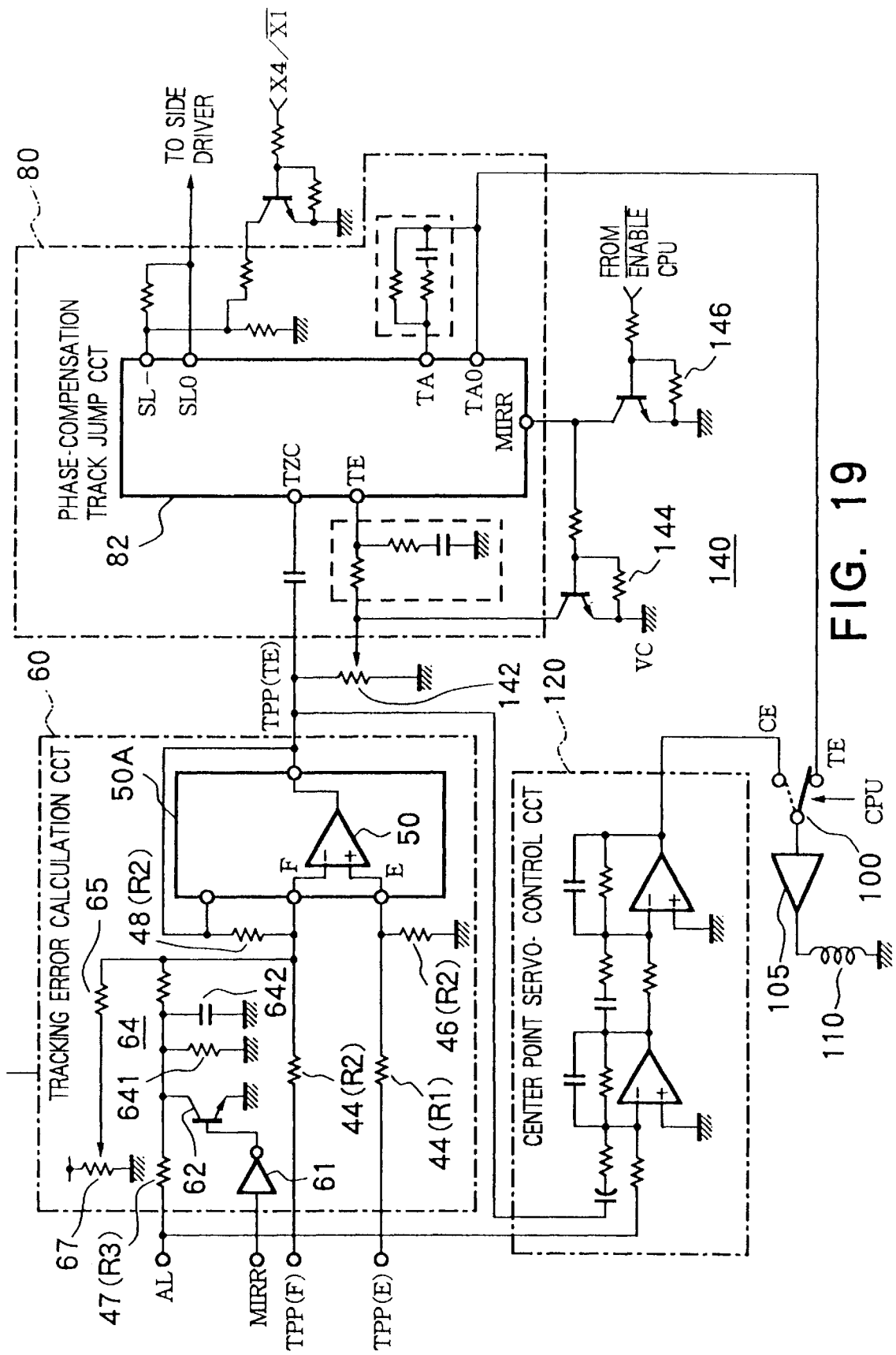
FIG. 19 is a view showing a detailed circuit of a tracking control apparatus of the optical disc apparatus of the eighth embodiment of the present invention and a detailed circuit of the circuit of the related part.

FIG. 19 is a view of a concrete circuit of the eighth embodiment and a related circuit thereof.

In this embodiment, the tracking error signal TPP (TE) is calculated based on the seventh embodiment, that is, based on the circuit shown in FIG. 16 as the tracking error calculation circuit 60. However, for the calculation of the tracking error signal TPP (TE), it is possible to use any of the above embodiments. Of course, it is also possible to use the usual tracking error signal TE, that is, the tracking error signal TE calculated without performing the above top hold processing, in the eighth embodiment of the present invention.

Note, in the following example, as a preferred embodiment, a case where the tracking error signal TPP (TE) is calculated based on the circuit illustrated in FIG. 16 will be explained.

The circuit of the eighth embodiment of the present invention is shown as a mask processing circuit 140, but before this, a description will be made of details of the tracking error calculation circuit 60.

A description will be made of the circuit corresponding to the above circuit of the seventh embodiment.

In the tracking error calculation circuit 60, resistors 46 and 48 are provided outside of the integrated circuit chip 50A corresponding to the RFIC of FIG. 12. Inside the integrated circuit chip 50A, the differential amplification circuit 50 in the RFIC shown in FIG. 12 and the peripheral circuits thereof are accommodated. By providing the resistors 46 and 48 outside of the integrated circuit chip 50A in this way, the difficulty of mounting resistors having a large resistance value in the semiconductor integrated circuit is avoided and, at the same time, the mounting of the resistors 46 and 48 as the outer attached resistors is facilitated in the same way as the resistors 42 and 44, and also the change thereof is facilitated.

The tracking error calculation circuit 60 is provided with a transistor 62 for substantially largely switching the TPP calculation coefficient when the level of the mirror signal MIRR is low, that is, at the time of the detrack state, at the rear of the resistor 47. An inverter 61 is connected to the base of the transistor 62.

Further, the tracking error calculation circuit 60 is provided with the low-pass filter circuit 64 for passing the low frequency component of the alignment signal AL. The low-pass filter circuit 64 is constituted by a resistor 641, a capacitor 642, and a resistor 642. Particularly, the capacitor 642 acts as a circuit for extracting the low frequency signal component. Note that the tracking error calculation circuit 60 is further provided with a serial circuit of the variable resistor 67 and resistor 65 parallel to the serial circuit of the resistor 47 and the low-pass filter circuit 64.

At the time of a detrack state, the transistor 62 is turned on, and the alignment signal AL is not added to the top hold first sum signal TPP (E). Accordingly, the value of the TPP calculation coefficient does not change. On the other hand, at the time of an on-track state, the transistor 62 is turned off, and the alignment signal AL is added to the top hold first sum signal TPP (E). Accordingly, the value of the TPP calculation coefficient prescribed in the frequency band at that time becomes substantially small.

This calculation will be additionally described. When considering the change of the TPP calculation coefficient, if it is set to the prescribed value at the time of an on-track state, the result becomes substantially the same as that where it is set to a value larger than the prescribed value thereof at the time of the detrack state.

As described above, in this tracking error calculation circuit 60, the low-pass filter circuit 64 including the capacitor 642 is provided, thereby to make it possible to change the TPP calculation coefficient K in accordance with the frequency band, and in addition, the TPP calculation coefficient can be changed in accordance with the tracking state by the transistor 62. As a result, a correct tracking error signal is obtained in accordance with the frequency characteristic. In addition, a quick tracking calculation becomes possible, for example, at the time of 4x playback in a CD-ROM drive.

Modification

In the circuit configuration of FIG. 19, it is also possible to constitute the circuit so that the inverter 61 is removed and the output of the low-pass filter circuit 64 is added to the top hold second sum signal TPP (F).

Mask Processing Circuit 140

A mask processing circuit 140 comprises a variable resistor 142, a first switching transistor 144 computing by the mirror signal MIRR calculated by a phase compensation track jump circuit 82 in a phase compensation track jump circuit, and a second switching transistor 144 computing by an inverted ENABLE signal from a not illustrated CPU.

The inverted ENABLE signal is a signal for determining the calculation timing given from the CPU such as microcomputer for performing the tracking servo control.

Figure 20:
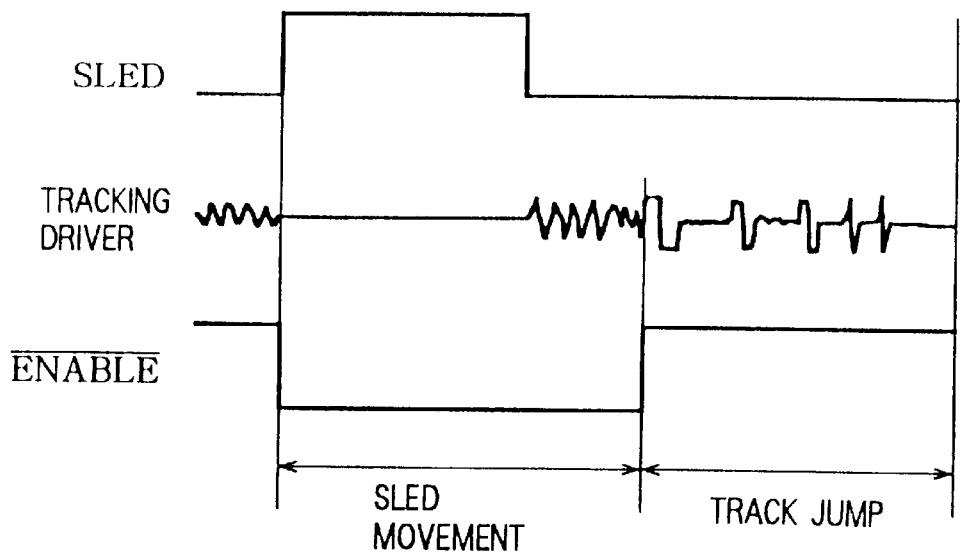
FIG. 20 is an calculation timing chart for making the sled perform a track jump calculation.

The inverted ENABLE signal is at a low level at the high speed feeding of the sled as illustrated in FIG. 20, therefore, the second switching transistor 146 has been turned off, thereby making the mirror signal MIRR from the phase compensation track jump circuit 82 valid. During the period when the inverted ENABLE signal is at a low level, when the mirror signal MIRR is at a high level, that is, at the time of a detrack state, the first switching transistor 144 is turned on, therefore, the tracking error signal TPP (TE) applied to the phase compensation track jump circuit 80 via the variable resistor 142 falls to the middle point potential VC=0 and the hysteresis tracking error signal TEh is generated. Namely, the tracking error signal TPP (TE) applied to a tracking zero cross terminal TZC of the phase compensation track jump circuit 82 becomes the nonlinear tracking error signal TEh fallen to VC in a half cycle.

The nonlinear tracking error signal TEh is phase-compensated in the phase compensation track jump circuit 80 for generating the signal for making the sled shown in FIG. 20 perform the track jump calculation. In the case of the tracking servo control, it passes through the switch circuit 100 selecting the tracking error signal and is applied to a tracking driver circuit 110 and drives a tracking coil 120, whereby the tracking servo control is carried out.

In the eighth embodiment of the present invention, as mentioned above, a nonlinear tracking error signal TEh is used, therefore, even if there is movement of the field of vision of the object lens 5, the error is not accumulated. As a result, the oscillation of the tracking servo control can be prevented.

The phase compensation track jump calculation itself shown in FIG. 20 is not directly related to the eighth embodiment of the present invention, therefore the details thereof will not be described.

The top hold tracking error signal TPP (TE) calculated in the tracking error calculation circuit 60 is applied to the middle point servo control circuit 120 for controlling the optical pick-up to the middle point position of the track when performing the coarse control for moving the optical pick-up to the vicinity of the track and is used for the generation of the middle point servo control signal CE together with the alignment signal AL.

Figure 21:
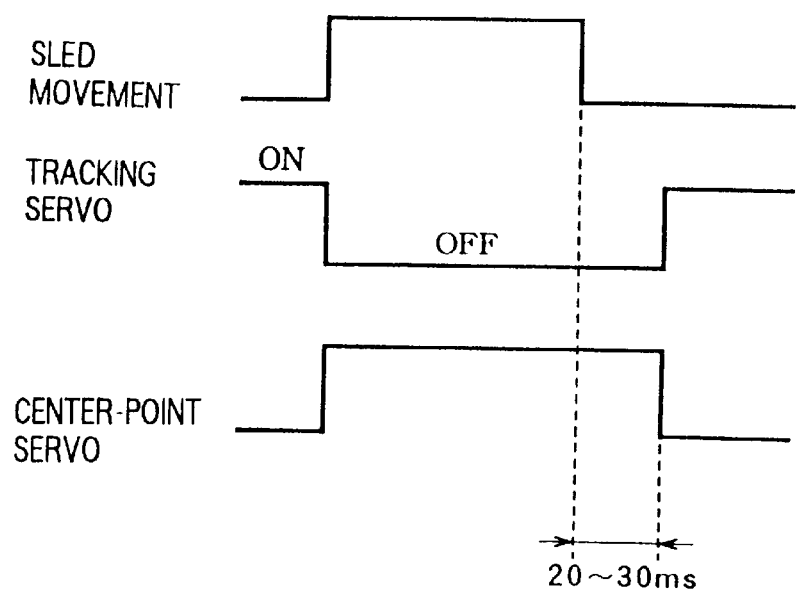
FIG. 21 is a timing chart showing the calculation of the middle point servo control.

FIG. 21 shows the calculation of the middle point servo control, but this is not directly related to the present invention, therefore, the details thereof will not be described.

As the optical recording apparatus of the present invention, a mini-disc apparatus, CD drive, etc. were mentioned above. The signal processing was explained above for the top hold tracking error signal TPP (TE) used in these apparatuses. The present invention however is not limited to the mini-disc apparatus, CD drive, etc. and can be applied to other optical recording apparatuses using a tracking error signal.

The top hold tracking error signal TPP (TE) according to the present invention contains almost no offset, therefore the tracking servo control in the optical recording apparatus is accurately carried out. Particularly, in the present invention, the optimization of the top hold coefficient is achieved in accordance with the frequency characteristic, and in addition, the optimum value is selected in accordance with the tracking state, therefore the tracking error signal enabling the best tracking control can be provided.

Further, according to the present invention, it is possible to use a nonlinear tracking error signal for the tracking servo control and therefore prevent the accumulation of deviations of tracking errors caused by movement of the field of vision of the object lens and prevent the oscillation of the tracking servo control and thereby to perform stable tracking servo control.

While the invention has been described with reference to specific embodiments chosen for purposes of illustration, it should be apparent that numerous modifications could be made thereto by those skilled in the art without departing from the basic concept and scope of the invention.

What is claimed is:

1. A tracking control apparatus of an optical disc apparatus having a light receiving means for outputting first and second received light detection signals from regions located on two sides of a center of a track of a disc-like recording medium, calculating a tracking error signal from said first and second received light detection signals, and performing tracking servo control by using the tracking error signal, said tracking control apparatus comprising:

a first calculation circuit for detecting a peak of the first received light detection signal from the light receiving means and subtracting a signal obtained by multiplying a first coefficient with the peak from the first received light detection signal to calculate a first calculation signal;

a second calculation circuit for detecting a peak of the second received light detection signal from the light receiving means and subtracting a signal obtained by multiplying a second coefficient with the peak from the second received light detection signal to calculate a second calculation signal;

a third calculation circuit for subtracting the second calculation signal from the first calculation signal to calculate the tracking error signal;

a signal processing means for masking a half cycle of an off-track part of the tracking error signal at a time of an on-track state immediately after a sled high speed feed calculation; and a tracking servo control means for performing the tracking servo control by using the masked tracking error signal.

2. The tracking control apparatus of claim 1, further comprising:

a filter circuit for passing a predetermined frequency component of a third signal comprised of a difference between the first received light detection signal and the second received light detection signal therethrough; and a circuit for adding the third signal passed through the filter circuit to at least one of the first calculation signal and the second calculation signal.

3. The tracking control apparatus of claim 2, further comprising:

a selective signal adding circuit for adding the predetermined frequency component signal of the third signal to at least one of the first calculation signal and the second calculation signal in accordance with a level of a mirror signal having an on-off level prescribed according to the on-track state or a detrack state.

4. The tracking control apparatus of claim 1, further comprising:

a selective signal adding circuit for adding a third signal comprised of a difference between the first received light detection signal and the second received light detection signal to at least one of the first calculation signal and the second calculation signal in accordance with a level of a mirror signal having an on-off level prescribed according to the on-track state or a detrack state.

5. A tracking control apparatus of an optical disc apparatus for performing reproduction and/or recording of a signal from a disc-like recording medium, comprising:

a condensing means for condensing a light beam emitted from a light source toward the disc-like recording medium;

a light receiving means for receiving the light beam reflected from the disc-like recording medium and outputting first and second received light detection signals from regions located on the two sides of the center of a signal track of the disc-like recording medium;

a first computing means for calculating a first calculation signal based on the first received light detection signal detected by the light receiving means;

a second computing means for calculating a second calculation signal based on the second received light detection signal detected by the light receiving means;

a third computing means for calculating a tracking error signal based on the first calculation signal and the second calculation signal;

a signal processing means for masking a half cycle of an off-track part of the tracking error signal at a time of transition from an off-track state to an on-track state immediately after high speed movement of the condensing means; and a tracking servo means for performing the tracking servo control of the condensing means by using the masked tracking error signal.

6. The tracking control apparatus of claim 5, wherein the light receiving means is provided with first and second light receiving element groups each divided into a plurality of sections.

7. A tracking control apparatus of an optical disc apparatus for performing reproduction and/or recording of a signal from a disc-like recording medium, comprising:

a condensing means for condensing a light beam emitted from a light source toward the disc-like recording medium;

a light receiving means for receiving the light beam reflected from the disc-like recording medium and outputting first and second received light detection signals from regions located on the two sides of the center of a signal track of the disc-like recording medium;

a first computing means for calculating a first calculation signal based on the first received light detection signal detected by the light receiving means, wherein the first computing means is a calculation circuit for detecting a peak of the first received light detection signal and subtracting a signal obtained by multiplying a first coefficient with the peak of the first received light detection signal to calculate the first calculation signal;

a second computing means for calculating a second calculation signal based on the second received light detection signal detected by the light receiving means, wherein the second computing means is a calculation circuit for detecting a peak of the second received light detection signal and subtracting a signal obtained by multiplying a second coefficient with the peak of the second received light detection signal to calculating the second calculation signal;

a third computing means for calculating a tracking error signal based on the first calculation signal and the second calculation signal;

a signal processing means for masking a half cycle of an off-track part of the tracking error signal at a time of transition from an off-track state to an on-track state immediately after high speed movement of the condensing means; and a tracking servo means for performing the tracking servo control of the condensing means by using the masked tracking error signal.

8. The tracking control apparatus of claim 5, wherein:
the condensing means forms a single light spot on the disc-like recording medium.

9. A tracking control method of calculating a tracking error signal from first and second received light detection signals respectively detected from two side regions of a center of a track of a disc-like recording medium and using the tracking error signal for performing tracking servo control, said tracking control method including the steps of:

detecting a peak of the first received light detection signal and subtracting a signal obtained by multiplying a first coefficient with the peak of the first received light detection signal to calculate a first calculation signal;

detecting a peak of the second received light detection signal and subtracting a signal obtained by multiplying a second coefficient with the peak of the second received light detection signal to calculate a second calculation signal;

calculating a tracking error signal by subtracting the second calculation signal from the first calculation signal;

masking a half cycle of an off-track part of the tracking error signal at a time of an on-track state immediately after a sled high speed feed calculation; and performing the tracking servo control by using the masked tracking error signal.

10. A tracking control apparatus of an optical disc apparatus having at least one photodiode for outputting first and second received light detection signals from regions located on two sides of a center of a track of a disc-like recording medium, calculating a tracking error signal from said first and second received light detection signals, and performing tracking servo control by using the tracking error signal, said tracking control apparatus comprising:

a first calculation circuit for detecting a peak of the first received light detection signal from the at least one photodiode and subtracting a signal obtained by multiplying a first coefficient with the peak from the first received light detection signal to calculate a first calculation signal;

a second calculation circuit for detecting a peak of the second received light detection signal from the at least one photodiode and subtracting a signal obtained by multiplying a second coefficient with the peak from the second received light detection signal to calculate a second calculation signal;

a third calculation circuit for subtracting the second calculation signal from the first calculation signal to calculate the tracking error signal;

a signal processing circuit for masking a half cycle of an off-track part of the tracking error signal at a time of an on-track state immediately after a sled high speed feed calculation; and a tracking servo control circuit for performing the tracking servo control by using the masked tracking error signal.

11. The tracking control apparatus of claim 10, further comprising:

a filter circuit for passing a predetermined frequency component of a third signal comprised of a difference between the first received light detection signal and the second received light detection signal therethrough; and a circuit for adding the third signal passed through the filter circuit to at least one of the first calculation signal and the second calculation signal.

12. The tracking control apparatus of claim 11, further comprising:

a selective signal adding circuit for adding the predetermined frequency component signal of the third signal to at least one of the first calculation signal and the second calculation signal in accordance with a level of a mirror signal having an on-off level prescribed according to the on-track state or a detrack state.

13. The tracking control apparatus of claim 10, further comprising:

a selective signal adding circuit for adding a third signal comprised of a difference between the first received light detection signal and the second received light detection signal to at least one of the first calculation signal and the second calculation signal in accordance with a level of a mirror signal having an on-off level prescribed according to the on-track state or a detrack state.

14. A tracking control apparatus of an optical disc apparatus for performing reproduction and/or recording of a signal from a disc-like recording medium, comprising:

an object lens for condensing a light beam emitted from a light source toward the disc-like recording medium;

at least one photodiode for receiving the light beam reflected from the disc-like recording medium and outputting first and second received light detection signals from regions located on the two sides of the center of a signal track of the disc-like recording medium;

a first calculation circuit for calculating a first calculation signal based on the first received light detection signal detected by the at least one photodiode;

a second calculation circuit for calculating a second calculation signal based on the second received light detection signal detected by the at least one photodiode;

a third calculation circuit for calculating a tracking error signal based on the first calculation signal and the second calculation signal;

a signal processing circuit for masking a half cycle of an off-track part of the tracking error signal at a time of transition from an off-track state to an on-track state immediately after high speed movement of the object lens; and a tracking servo circuit for performing the tracking servo control of the object lens by using the masked tracking error signal.

15. The tracking control apparatus of claim 14, wherein the at least one photodiode comprises first and second photodiodes each having a plurality of sections.

16. The tracking control apparatus of claim 14, wherein:

the first calculation circuit is further configured for detecting a peak of the first received light detection signal and subtracting a signal obtained by multiplying a first coefficient with the peak of the first received light detection signal to calculate the first calculation signal; and the second calculation circuit is further configured for detecting a peak of the second received light detection signal and subtracting a signal obtained by multiplying a second coefficient with the peak of the second received light detection signal to calculating the second calculation signal.

17. The tracking control apparatus of claim 14, wherein:

the object lens forms a single light spot on the disc-like recording medium.

18. The tracking control method of claim 9, further comprising the steps of:

filtering a predetermined frequency component of a third signal comprised of a difference between the first received light detection signal and the second received light detection signal; and adding the filtered third signal to at least one of the first calculation signal and the second calculation signal, before said step of calculating.

19. The tracking control method of claim 18, wherein said step of adding comprises:

adding the filtered third signal to at least one of the first calculation signal and the second calculation signal in accordance with a level of a mirror signal having an on-off level prescribed according to the on-track state or a detrack state.

20. The tracking control method of claim 9, further comprising the step of:

selectively adding a third signal comprised of a difference between the first received light detection signal and the second received light detection signal to at least one of the first calculation signal and the second calculation signal in accordance with a level of a mirror signal having an on-off level prescribed according to the on-track state or a detrack state.

21. The tracking control apparatus of claim 5, wherein:

the first computing means is a calculation circuit for detecting a peak of the first received light detection signal and subtracting a signal obtained by multiplying a first coefficient with the peak of the first received light detection signal to calculate the first calculation signal; and the second computing means is a calculation circuit for detecting a peak of the second received light detection signal and subtracting a signal obtained by multiplying a second coefficient with the peak of the second received light detection signal to calculating the second calculation signal.

* * * * *